US010631234B2

(12) United States Patent
Gupta et al.

(10) Patent No.: US 10,631,234 B2
(45) Date of Patent: Apr. 21, 2020

(54) DEVICES AND METHODS FOR NORMAL AND ENHANCED COVERAGE COMPATIBILITY

(71) Applicant: Intel Corporation, Santa Clara, CA (US)

(72) Inventors: Anshul Kumar Gupta, Bangalore (IN); Rishav Dev, Bangalore (IN); Neelesh Animireddy, Bangalore (IN)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/718,048

(22) Filed: Sep. 28, 2017

(65) Prior Publication Data

US 2019/0098564 A1    Mar. 28, 2019

(51) Int. Cl.
| | |
|---|---|
| *H04W 4/00* | (2018.01) |
| *H04W 48/16* | (2009.01) |
| *H04W 72/08* | (2009.01) |
| *H04W 16/14* | (2009.01) |
| *H04L 29/08* | (2006.01) |
| *H04W 72/04* | (2009.01) |
| *H04W 48/12* | (2009.01) |
| *H04W 48/20* | (2009.01) |

(52) U.S. Cl.
CPC ......... *H04W 48/16* (2013.01); *H04L 67/2842* (2013.01); *H04W 16/14* (2013.01); *H04W 72/0473* (2013.01); *H04W 72/085* (2013.01); *H04W 48/12* (2013.01); *H04W 48/20* (2013.01)

(58) Field of Classification Search
CPC . H04W 48/16; H04W 16/14; H04W 72/0473; H04W 72/0085; H04W 16/26; H04W 72/042; H04L 67/2842
See application file for complete search history.

(56) References Cited

U.S. PATENT DOCUMENTS

| | | | |
|---|---|---|---|
| 2013/0016665 A1* | 1/2013 | Kubota | H04W 36/0022 370/328 |
| 2014/0307550 A1* | 10/2014 | Forssell | H04W 36/22 370/235 |
| 2016/0212664 A1* | 7/2016 | Uemura | H04W 24/08 |
| 2016/0242206 A1* | 8/2016 | Ohlsson | H04W 72/1231 |
| 2016/0330677 A1* | 11/2016 | Wu | H04W 48/02 |
| 2016/0338008 A1* | 11/2016 | Xia | H04W 48/10 |
| 2017/0105166 A1* | 4/2017 | Lee | H04W 48/12 |
| 2018/0070282 A1* | 3/2018 | Su | H04W 36/32 |
| 2018/0109982 A1* | 4/2018 | Zheng | H04W 76/18 |

(Continued)

OTHER PUBLICATIONS

"Evolved Universal Terrestrial Radio Access (E-UTRA);User Equipment (UE) procedures in idle mode"; 3GPP TS 36.304, 3rd Generation Partnership Project,(Release 13),pp. 20-21; p. 27,Technical Specification Group Radio Access Network, V13.7.0, 2017.

(Continued)

*Primary Examiner* — Barry W Taylor

(57) ABSTRACT

Methods and devices for providing normal and enhanced coverage cell selection and reselection capabilities, including the acquisition and monitoring of enhanced coverage information while camped on a cell in normal coverage, implementation of a threshold for a cell selection criteria prior to transitioning between normal and enhanced coverage while camped on a cell, and introduction of priority lists for cell reselection.

20 Claims, 12 Drawing Sheets

(56) References Cited

U.S. PATENT DOCUMENTS

2018/0167911 A1* 6/2018 Kota ................... H04W 72/02
2019/0045429 A1* 2/2019 Koskinen ............. H04B 17/318

OTHER PUBLICATIONS

"Evolved Universal Terrestrial Radio Access (E-UTRA);Radio Resource Control (RRC)"; 3GPP TS 36.331, 3rd Generation Partnership Project, (Release 14),Technical Specification Group Radio Access Network, pp. 41-42; pp. 298-305; pp. 323-333, Protocol specification, V14.4.0,2017.

\* cited by examiner

DEVICES AND METHODS FOR NORMAL AND ENHANCED COVERAGE COMPATIBILITY

TECHNICAL FIELD

Various aspects relate generally to wireless communications.

BACKGROUND

Release 13 of the Third Generation Partnership Project (3GPP) introduced a feature to support Long Term Evolution (LTE) coverage enhancement for User Equipment (UE) in poor signal scenarios, e.g. near a cell edge, in a subterranean structure, in a structure generally leading to signal penetration losses, etc. Several coverage enhancement modes improve for successful signaling between an eNodeB and a UE in such conditions by increasing the repetition of signaling and/or increasing the transmission power.

While the coverage enhancement feature was designed with bandwidth reduced, low complexity (BRLC) user equipment (UE) in mind, non-BRLC UEs may also be able to reap benefits provided by coverage enhancement.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DESCRIPTION

Figure 1:
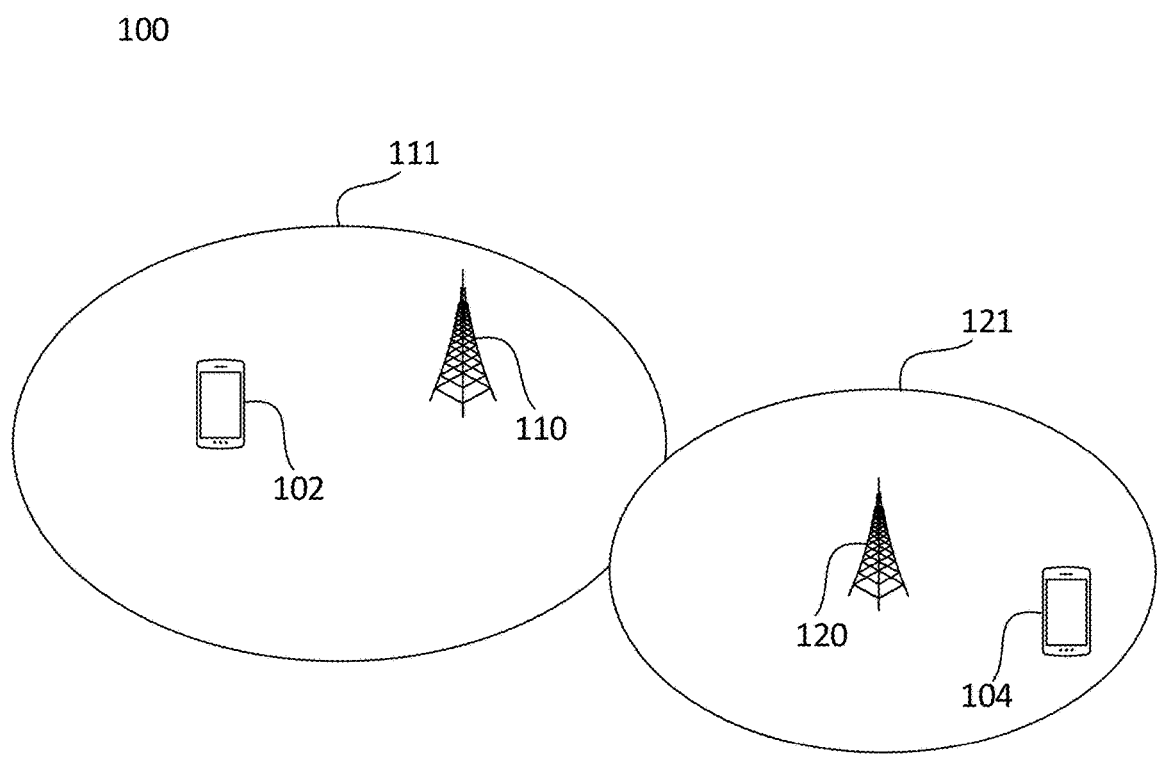
FIG. 1 shows an exemplary radio communication network according to some aspects.

The following detailed description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

The words "plurality" and "multiple" in the description or the claims expressly refer to a quantity greater than one. The terms "group (of)", "set [of]", "collection (of)", "series (of)", "sequence (of)", "grouping (of)", etc., and the like in the description or in the claims refer to a quantity equal to or greater than one, i.e. one or more. Any term expressed in plural form that does not expressly state "plurality" or "multiple" likewise refers to a quantity equal to or greater than one. The terms "proper subset", "reduced subset", and "lesser subset" refer to a subset of a set that is not equal to the set, i.e. a subset of a set that contains less elements than the set.

It is appreciated that any vector and/or matrix notation utilized herein is exemplary in nature and is employed solely for purposes of explanation. Accordingly, it is understood that the approaches detailed in this disclosure are not limited to being implemented solely using vectors and/or matrices, and that the associated processes and computations may be equivalently performed with respect to sets, sequences, groups, etc., of data, observations, information, signals, samples, symbols, elements, etc. Furthermore, it is appreciated that references to a "vector" may refer to a vector of any size or orientation, e.g. including a 1×1 vector (e.g. a scalar), a 1×M vector (e.g. a row vector), and an M×1 vector (e.g. a column vector). Similarly, it is appreciated that references to a "matrix" may refer to matrix of any size or orientation, e.g. including a 1×1 matrix (e.g. a scalar), a 1×M matrix (e.g. a row vector), and an M×1 matrix (e.g. a column vector).

The terms "circuit" or "circuitry" as used herein are understood as any kind of logic-implementing entity, which may include special-purpose hardware or a processor executing software. A circuit may thus be an analog circuit, digital circuit, mixed-signal circuit, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Any other kind of implementation of the respective functions which will be described below in further detail may also be understood as a "circuit". It is understood that any two (or more) of the circuits detailed herein may be realized as a single circuit with substantially equivalent functionality, and conversely that any single circuit detailed herein may be realized as two (or more) separate circuits with substantially equivalent functionality. Additionally, references to a "circuit" may refer to two or more circuits that collectively form a single circuit. The term "circuit arrangement" may refer to a single circuit, a collection of circuits, and/or an electronic device composed of one or more circuits.

As used herein, "memory" may be understood as a non-transitory computer-readable medium in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, etc., or any combination thereof. Furthermore, it is appreciated that registers, shift registers, processor registers, data buffers, etc., are also embraced herein by the term memory. It is appreciated that a single component referred to as "memory" or "a memory" may be composed of more than one different type of memory, and thus may refer to a collective component comprising one or more types of memory. It is readily understood that any single memory component may be separated into multiple collectively equivalent memory components, and vice versa. Furthermore, while memory may be depicted as separate from one or more other components (such as in the drawings), it is understood that memory may be integrated within another component, such as on a common integrated chip.

The term "software" refers to any type of executable instruction, including firmware.

The term "terminal device" utilized herein refers to user-side devices (both mobile and immobile) that can connect to a core network and various external networks via a radio access network. "Terminal device" can include any mobile or immobile wireless communication device, including User Equipments (UEs), Mobile Stations (MSs), Stations (STAs), cellular phones, tablets, laptops, personal computers, wearables, multimedia playback and other handheld electronic devices, consumer/home/office/commercial appliances, vehicles, and any other electronic device capable of user-side wireless communications. Without loss of generality, in some cases terminal devices can also include application-layer components, such as application processors or other general processing components, that are directed to functionality other than wireless communications. Terminal devices can also support wired communications in addition to wireless communications. Furthermore, terminal devices can include vehicular communication devices that function as terminal devices.

The term "network access node" as utilized herein refers to a network-side device that provides a radio access network with which terminal devices can connect and exchange information with other networks through the network access node. "Network access nodes" can include any type of base station or access point, including macro base stations, micro base stations, NodeBs, evolved NodeBs (eNodeBs or eNBs), Home eNodeBs, Remote Radio Heads (RRHs), relay points, Wi-Fi/WLAN Access Points (APs), Bluetooth master devices, DSRC RSUs, terminal devices acting as network access nodes, and any other electronic device capable of network-side wireless communications, including both immobile and mobile devices (e.g., vehicular network access nodes, mobile cells, and other movable network access nodes). As used herein, a "cell" in the context of telecommunications may be understood as a sector served by a network access node. Accordingly, a cell may be a set of geographically co-located antennas that correspond to a particular sectorization of a network access node. A network access node can thus serve one or more cells (or sectors), where each cell is characterized by a distinct communication channel. Furthermore, the term "cell" may be utilized to refer to any of a macrocell, microcell, femtocell, picocell, etc. Certain communication devices can act as both terminal devices and network access nodes, such as a terminal device that provides a network connection for other terminal devices.

The term "base station" used in reference to an access point of a mobile communication network may be understood as a macro base station, micro base station, Node B, evolved NodeB (eNB), Home eNodeB, Remote Radio Head (RRH), relay point, etc. As used herein, a "cell" in the context of telecommunications may be understood as a sector served by a base station. Accordingly, a cell may be a set of geographically co-located antennas that correspond to a particular sectorization of a base station. A base station may thus serve one or more cells (or sectors), where each cell is characterized by a distinct communication channel. Furthermore, the term "cell" may be utilized to refer to any of a macrocell, microcell, femtocell, picocell, etc.

Various aspects of this disclosure may utilize or be related to radio communication technologies. While some examples may refer to specific radio communication technologies, these examples are demonstrative and may be analogously applied to other radio communication technologies, including, but not limited to, a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology, for example Universal Mobile Telecommunications System (UMTS), Freedom of Multimedia Access (FOMA), 3GPP Long Term Evolution (LTE), 3GPP Long Term Evolution Advanced (LTE Advanced), Code division multiple access 2000 (CDMA2000), Cellular Digital Packet Data (CDPD), Mobitex, Third Generation (3G), Circuit Switched Data (CSD), High-Speed Circuit-Switched Data (HSCSD), Universal Mobile Telecommunications System (Third Generation) (UMTS (3G)), Wideband Code Division Multiple Access (Universal Mobile Telecommunications System) (W-CDMA (UMTS)), High Speed Packet Access (HSPA), High-Speed Downlink Packet Access (HSDPA), High-Speed Uplink Packet Access (HSUPA), High Speed Packet Access Plus (HSPA+), Universal Mobile Telecommunications System-Time-Division Duplex (UMTS-TDD), Time Division-Code Division Multiple Access (TD-CDMA), Time Division-Synchronous Code Division Multiple Access (TD-CDMA), 3rd Generation Partnership Project Release 8 (Pre-4th Generation) (3GPP Rel. 8 (Pre-4G)), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), 3GPP Rel. 13 (3rd Generation Partnership Project Release 13), 3GPP Rel. 14 (3rd Generation Partnership Project Release 14), 3GPP Rel. 15 (3rd Generation Partnership Project Release 15), 3GPP Rel. 16 (3rd Generation Partnership Project Release 16), 3GPP Rel. 17 (3rd Generation Partnership Project Release 17), 3GPP Rel. 18 (3rd Generation Partnership Project Release 18), 3GPP 5G, 3GPP LTE Extra, LTE-Advanced Pro, LTE Licensed-Assisted Access (LAA), MuLTEfire, UMTS Terrestrial Radio Access (UTRA), Evolved UMTS Terrestrial Radio Access (E-UTRA), Long Term Evolution Advanced (4th Generation) (LTE Advanced (4G)), cdmaOne (2G), Code division multiple access 2000 (Third generation) (CDMA2000 (3G)), Evolution-Data Optimized or Evolution-Data Only (EV-DO), Advanced Mobile Phone System (1st Generation) (AMPS (1G)), Total Access Communication System/Extended Total Access Communication System (TACS/ETACS), Digital AMPS (2nd Generation) (D-AMPS (2G)), Push-to-talk (PTT), Mobile Telephone System (MTS), Improved Mobile Telephone System (IMTS), Advanced Mobile Telephone System (AMTS), OLT (Norwegian for Offentlig Landmobil Telefoni, Public Land Mobile Telephony), MTD (Swedish abbreviation for Mobiltelefonisystem D, or Mobile telephony system D), Public Automated Land Mobile (Autotel/PALM), ARP (Finnish for Autoradiopuhelin, "car radio phone"), NMT (Nordic Mobile Telephony), High capacity version of NTT (Nippon Telegraph and Telephone) (Hicap), Cellular Digital Packet Data (CDPD), Mobitex, DataTAC, Integrated Digital Enhanced Network (iDEN), Personal Digital Cellular (PDC), Circuit Switched Data (CSD), Personal Handyphone System (PHS), Wideband Integrated Digital Enhanced Network (WiDEN), iBurst, Unlicensed Mobile Access (UMA), also referred to as also referred to as 3GPP Generic Access Network, or GAN standard), Zigbee, Bluetooth®, Wireless Gigabit Alliance (WiGig) standard, mmWave standards in general (wireless systems operating at 10-300 GHz and above such as WiGig, IEEE 802.11ad, IEEE 802.11ay, etc.), technologies operating above 300 GHz and THz bands, (3GPP/LTE based or IEEE 802.11p and other) Vehicle-to-Vehicle (V2V) and Vehicle-to-X (V2X) and Vehicle-to-Infrastructure (V2I) and Infrastructure-to-Vehicle (I2V) communication technologies, 3GPP cellular V2X, DSRC (Dedicated Short Range Communications) communication systems such as Intelligent-Transport-Systems, and other existing, developing, or future radio communication technologies. Aspects described herein may use such radio communication technologies according to various spectrum management schemes, including, but not limited to, dedicated licensed spectrum, unlicensed spectrum, (licensed) shared spectrum (such as LSA=Licensed Shared Access in 2.3-2.4 GHz, 3.4-3.6 GHz, 3.6-3.8 GHz and further frequencies and SAS=Spectrum Access System in 3.55-3.7 GHz and further frequencies), and may be use various spectrum bands including, but not limited to, IMT (International Mobile Telecommunications) spectrum (including 450-470 MHz, 790-960 MHz, 1710-2025 MHz, 2110-2200 MHz, 2300-2400 MHz, 2500-2690 MHz, 698-790 MHz, 610-790 MHz, 3400-3600 MHz, etc., where some bands may be limited to specific region(s) and/or countries), IMT-advanced spectrum, IMT-2020 spectrum (expected to include 3600-3800 MHz, 3.5 GHz bands, 700 MHz bands, bands within the 24.25-86 GHz range, etc.), spectrum made available under FCC's "Spectrum Frontier" 5G initiative (including 27.5-28.35 GHz, 29.1-29.25 GHz, 31-31.3 GHz, 37-38.6 GHz, 38.6-40 GHz, 42-42.5 GHz, 57-64 GHz, 64-71 GHz, 71-76 GHz, 81-86 GHz and 92-94 GHz, etc.), the ITS (Intelligent Transport Systems) band of 5.9 GHz (typically 5.85-5.925 GHz) and 63-64 GHz, bands currently allocated to WiGig such as WiGig Band 1 (57.24-59.40 GHz), WiGig Band 2 (59.40-61.56 GHz) and WiGig Band 3 (61.56-63.72 GHz) and WiGig Band 4 (63.72-65.88 GHz), the 70.2 GHz-71 GHz band, any band between 65.88 GHz and 71 GHz, bands currently allocated to automotive radar applications such as 76-81 GHz, and future bands including 94-300 GHz and above. Furthermore, aspects described herein can also employ radio communication technologies on a secondary basis on bands such as the TV White Space bands (typically below 790 MHz) where in particular the 400 MHz and 700 MHz bands are prospective candidates. Besides cellular applications, specific applications for vertical markets may be addressed such as PMSE (Program Making and Special Events), medical, health, surgery, automotive, low-latency, drones, etc. applications. Furthermore, aspects described herein may also use radio communication technologies with a hierarchical application, such as by introducing a hierarchical prioritization of usage for different types of users (e.g., low/medium/high priority, etc.), based on a prioritized access to the spectrum e.g. with highest priority to tier-1 users, followed by tier-2, then tier-3, etc. users, etc. Aspects described herein can also use radio communication technologies with different Single Carrier or OFDM flavors (CP-OFDM, SC-FDMA, SC-OFDM, filter bank-based multicarrier (FBMC), OFDMA, etc.) and in particular 3GPP NR (New Radio), which can include allocating the OFDM carrier data bit vectors to the corresponding symbol resources.

For purposes of this disclosure, radio communication technologies may be classified as one of a Short Range radio communication technology or Cellular Wide Area radio communication technology. Short Range radio communication technologies include Bluetooth, WLAN (e.g. according to any IEEE 802.11 standard), and other similar radio communication technologies. Cellular Wide Area radio communication technologies include Global System for Mobile Communications (GSM), Code Division Multiple Access 2000 (CDMA2000), Universal Mobile Telecommunications System (UMTS), Long Term Evolution (LTE), General Packet Radio Service (GPRS), Evolution-Data Optimized (EV-DO), Enhanced Data Rates for GSM Evolution (EDGE), High Speed Packet Access (HSPA; including High Speed Downlink Packet Access (HSDPA), High Speed Uplink Packet Access (HSUPA), HSDPA Plus (HSDPA+), and HSUPA Plus (HSUPA+)), Worldwide Interoperability for Microwave Access (WiMax) (e.g. according to an IEEE 802.16 radio communication standard, e.g. WiMax fixed or WiMax mobile), etc., and other similar radio communication technologies. Cellular Wide Area radio communication technologies also include "small cells" of such technologies, such as microcells, femtocells, and picocells. Cellular Wide Area radio communication technologies may be generally referred to herein as "cellular" communication technologies. It is understood that exemplary scenarios detailed herein are demonstrative in nature, and accordingly may be similarly applied to various other mobile communication technologies, both existing and not yet formulated, particularly in cases where such mobile communication technologies share similar features as disclosed regarding the following examples. Furthermore, as used herein the term GSM refers to both circuit- and packet-switched GSM, including, for example, GPRS, EDGE, and any other related GSM technologies. Likewise, the term UMTS refers to both circuit- and packet-switched GSM, including, for example, HSPA, HSDPA/HSUPA, HSDPA+/HSUPA+, and any other related UMTS technologies. As used herein, a first radio communication technology is different from a second radio communication technology if the first and second radio communication technologies are based on different communication standards.

The term "network" as utilized herein, e.g. in reference to a communication network such as a radio communication network, encompasses both an access section of a network (e.g. a radio access network (RAN) section) and a core section of a network (e.g. a core network section). The term "radio idle mode" or "radio idle state" used herein in reference to a terminal device refers to a radio control state in which the terminal device is not allocated at least one dedicated communication channel of a mobile communication network. The term "radio connected mode" or "radio connected state" used in reference to a terminal device refers to a radio control state in which the terminal device is allocated at least one dedicated uplink communication channel of a radio communication network.

Unless explicitly specified, the term "transmit" encompasses both direct (point-to-point) and indirect transmission (via one or more intermediary points). Similarly, the term "receive" encompasses both direct and indirect reception. Furthermore, the terms "transmit", "receive", "communicate", and other similar terms encompass both physical transmission (e.g., the transmission of radio signals) and logical transmission (e.g., the transmission of digital data over a logical software-level connection). For example, a processor may transmit or receive data in the form of radio signals with another processor, where the physical transmission and reception is handled by radio-layer components such as RF transceivers and antennas, and the logical transmission and reception is performed by the processor. The term "communicate" encompasses one or both of transmitting and receiving, i.e. unidirectional or bidirectional communication in one or both of the incoming and outgoing directions. The term "calculate" encompass both 'direct' calculations via a mathematical expression/formula/relationship and 'indirect' calculations via lookup or hash tables and other array indexing or searching operations.

FIG. 1 shows exemplary radio communication network 100 according to some aspects, which may include terminal devices 102 and 104 in addition to network access nodes (i.e. network access points) 110 and 120 with corresponding coverage regions (i.e. cells) 111 and 121, respectively. Communication network 100 may communicate via network access nodes 110 and 120 with terminal devices 102 and 104 via various mechanisms. Although certain examples described herein may refer to a particular radio access network context (e.g., LTE, UMTS, GSM, other 3rd Generation Partnership Project (3GPP) networks, WLAN/WiFi, Bluetooth, 5G, mmWave, etc.), these examples are demonstrative and may therefore be analogously applied to any other type or configuration of radio access network. The number of network access nodes and terminal devices in radio communication network 100 is exemplary and is scalable to any amount.

In an exemplary cellular context, network access nodes 110 and 120 may be base stations (e.g., eNodeBs, NodeBs, Base Transceiver Stations (BTSs), or any other type of base station), while terminal devices 102 and 104 may be cellular terminal devices (e.g., Mobile Stations (MSs), User Equipments (UEs), or any type of cellular terminal device). Network access nodes 110 and 120 may therefore interface (e.g., via backhaul interfaces) with a cellular core network such as an Evolved Packet Core (EPC, for LTE), Core Network (CN, for UMTS), or other cellular core networks, which may also be considered part of radio communication network 100. The cellular core network may interface with one or more external data networks. In an exemplary short-range context, network access node 110 and 120 may be access points (APs, e.g., WLAN or WiFi APs), while terminal device 102 and 104 may be short range terminal devices (e.g., stations (STAs)). Network access nodes 110 and 120 may interface (e.g., via an internal or external router) with one or more external data networks.

Network access nodes 110 and 120 (and, optionally, other network access nodes of radio communication network 100 not explicitly shown in FIG. 1) may accordingly provide a radio access network to terminal devices 102 and 104 (and, optionally, other terminal devices of radio communication network 100 not explicitly shown in FIG. 1). In an exemplary cellular context, the radio access network provided by network access nodes 110 and 120 may enable terminal devices 102 and 104 to wirelessly access the core network via radio communications. The core network may provide switching, routing, and transmission, for traffic data related to terminal devices 102 and 104, and may further provide access to various internal data networks (e.g., control nodes, routing nodes that transfer information between other terminal devices on radio communication network 100, etc.) and external data networks (e.g., data networks providing voice, text, multimedia (audio, video, image), and other Internet and application data). In an exemplary short-range context, the radio access network provided by network access nodes 110 and 120 may provide access to internal data networks (e.g., for transferring data between terminal devices connected to radio communication network 100) and external data networks (e.g., data networks providing voice, text, multimedia (audio, video, image), and other Internet and application data).

The radio access network and core network (if applicable, e.g. for a cellular context) of radio communication network 100 may be governed by communication protocols that can vary depending on the specifics of radio communication network 100. Such communication protocols may define the scheduling, formatting, and routing of both user and control data traffic through radio communication network 100, which includes the transmission and reception of such data through both the radio access and core network domains of radio communication network 100. Accordingly, terminal devices 102 and 104 and network access nodes 110 and 120 may follow the defined communication protocols to transmit and receive data over the radio access network domain of radio communication network 100, while the core network may follow the defined communication protocols to route data within and outside of the core network. Exemplary communication protocols include LTE, UMTS, GSM, WiMAX, Bluetooth, WiFi, mmWave, etc., any of which may be applicable to radio communication network 100.

Figure 2:
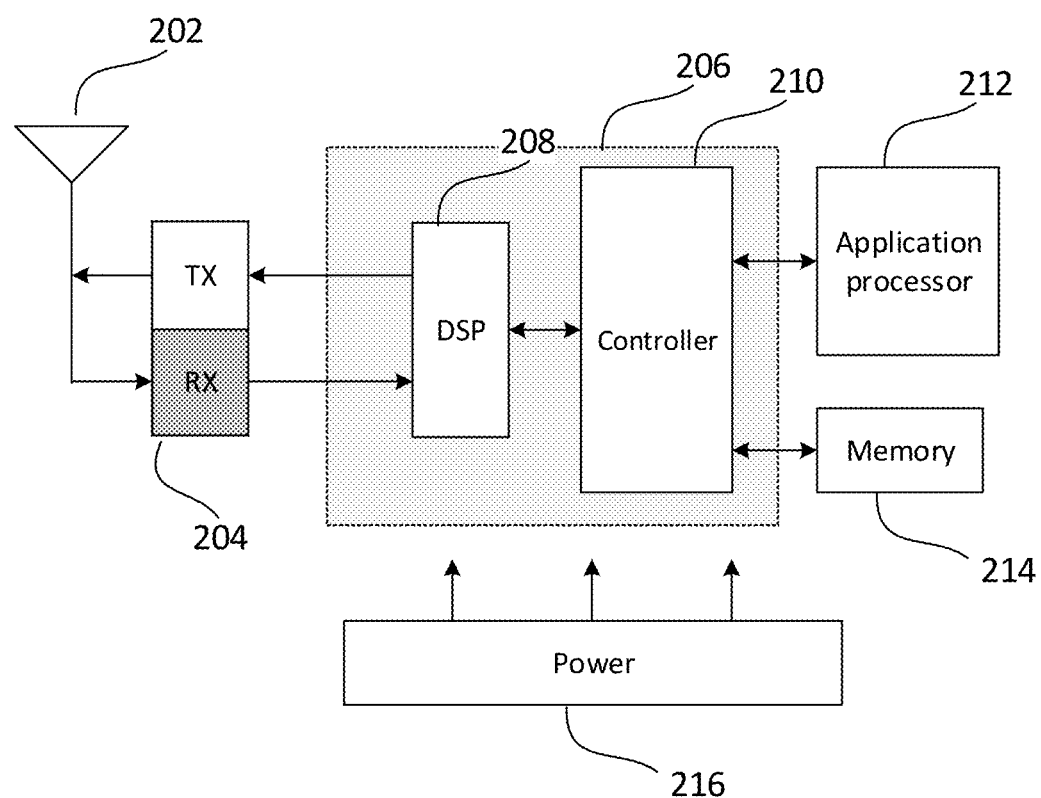
FIG. 2 shows an internal configuration of terminal device according to some aspects.

FIG. 2 shows an internal configuration of terminal device 102 according to some aspects, which may include antenna system 202, radio frequency (RF) transceiver 204, baseband modem 206 (including digital signal processor 208 and controller 210), application processor 212, memory 214, and power supply 216. Although not explicitly shown in FIG. 2, in some aspects terminal device 102 may include one or more additional hardware and/or software components, such as processors/microprocessors, controllers/microcontrollers, other specialty or generic hardware/processors/circuits, peripheral device(s), memory, power supply, external device interface(s), subscriber identity module(s) (SIMs), user input/output devices (display(s), keypad(s), touchscreen(s), speaker(s), external button(s), camera(s), microphone(s), etc.), or other related components.

Terminal device 102 may transmit and receive radio signals on one or more radio access networks. Baseband modem 206 may direct such communication functionality of terminal device 102 according to the communication protocols associated with each radio access network, and may execute control over antenna system 202 and RF transceiver 204 in order to transmit and receive radio signals according to the formatting and scheduling parameters defined by each communication protocol. Although various practical designs may include separate communication components for each supported radio communication technology (e.g., a separate antenna, RF transceiver, digital signal processor, and controller), for purposes of conciseness the configuration of terminal device 102 shown in FIG. 2 depicts only a single instance of such components.

Terminal device 102 may transmit and receive wireless signals with antenna system 202, which may be a single antenna or an antenna array that includes multiple antennas. In some aspects, antenna system 202 may additionally include analog antenna combination and/or beamforming circuitry. In the receive (RX) path, RF transceiver 204 may receive analog radio frequency signals from antenna system 202 and perform analog and digital RF front-end processing on the analog radio frequency signals to produce digital baseband samples (e.g., In-Phase/Quadrature (IQ) samples) to provide to baseband modem 206. RF transceiver 204 may include analog and digital reception components including amplifiers (e.g., Low Noise Amplifiers (LNAs)), filters, RF demodulators (e.g., RF IQ demodulators)), and analog-todigital converters (ADCs), which RF transceiver 204 may utilize to convert the received radio frequency signals to digital baseband samples. In the transmit (TX) path, RF transceiver 204 may receive digital baseband samples from baseband modem 206 and perform analog and digital RF front-end processing on the digital baseband samples to produce analog radio frequency signals to provide to antenna system 202 for wireless transmission. RF transceiver 204 may thus include analog and digital transmission components including amplifiers (e.g., Power Amplifiers (PAs), filters, RF modulators (e.g., RF IQ modulators), and digital-to-analog converters (DACs), which RF transceiver 204 may utilize to mix the digital baseband samples received from baseband modem 206 and produce the analog radio frequency signals for wireless transmission by antenna system 202. In some aspects baseband modem 206 may control the RF transmission and reception of RF transceiver 204, including specifying the transmit and receive radio frequencies for operation of RF transceiver 204.

As shown in FIG. 2, baseband modem 206 may include digital signal processor 208, which may perform physical layer (PHY, Layer 1) transmission and reception processing to, in the transmit path, prepare outgoing transmit data provided by controller 210 for transmission via RF transceiver 204, and, in the receive path, prepare incoming received data provided by RF transceiver 204 for processing by controller 210. Digital signal processor 208 may be configured to perform one or more of error detection, forward error correction encoding/decoding, channel coding and interleaving, channel modulation/demodulation, physical channel mapping, radio measurement and search, frequency and time synchronization, antenna diversity processing, power control and weighting, rate matching/dematching, retransmission processing, interference cancelation, and any other physical layer processing functions. Digital signal processor 208 may be structurally realized as hardware components (e.g., as one or more digitally-configured hardware circuits or FPGAs), software-defined components (e.g., one or more processors configured to execute program code defining arithmetic, control, and I/O instructions (e.g., software and/or firmware) stored in a non-transitory computer-readable storage medium), or as a combination of hardware and software components. In some aspects, digital signal processor 208 may include one or more processors configured to retrieve and execute program code that defines control and processing logic for physical layer processing operations. In some aspects, digital signal processor 208 may execute processing functions with software via the execution of executable instructions. In some aspects, digital signal processor 208 may include one or more dedicated hardware circuits (e.g., ASICs, FPGAs, and other hardware) that are digitally configured to specific execute processing functions, where the one or more processors of digital signal processor 208 may offload certain processing tasks to these dedicated hardware circuits, which are known as hardware accelerators. Exemplary hardware accelerators can include Fast Fourier Transform (FFT) circuits and encoder/decoder circuits. In some aspects, the processor and hardware accelerator components of digital signal processor 208 may be realized as a coupled integrated circuit.

Terminal device 102 may be configured to operate according to one or more radio communication technologies. Digital signal processor 208 may be responsible for lower-layer processing functions of the radio communication technologies, while controller 210 may be responsible for upper-layer protocol stack functions. Controller 210 may thus be responsible for controlling the radio communication components of terminal device 102 (antenna system 202, RF transceiver 204, and digital signal processor 208) in accordance with the communication protocols of each supported radio communication technology, and accordingly may represent the Access Stratum and Non-Access Stratum (NAS) (also encompassing Layer 2 and Layer 3) of each supported radio communication technology. Controller 210 may be structurally embodied as a protocol processor configured to execute protocol software (retrieved from a controller memory) and subsequently control the radio communication components of terminal device 102 in order to transmit and receive communication signals in accordance with the corresponding protocol control logic defined in the protocol software. Controller 210 may include one or more processors configured to retrieve and execute program code that defines the upper-layer protocol stack logic for one or more radio communication technologies, which can include Data Link Layer/Layer 2 and Network Layer/Layer 3 functions. Controller 210 may be configured to perform both user-plane and control-plane functions to facilitate the transfer of application layer data to and from radio terminal device 102 according to the specific protocols of the supported radio communication technology. User-plane functions can include header compression and encapsulation, security, error checking and correction, channel multiplexing, scheduling and priority, while control-plane functions may include setup and maintenance of radio bearers. The program code retrieved and executed by controller 210 may include executable instructions that define the logic of such functions.

Accordingly, baseband modem 206 may be configured to implement the methods and/or algorithms described in this disclosure.

In some aspects, terminal device 102 may be configured to transmit and receive data according to multiple radio communication technologies. Accordingly, in some aspects one or more of antenna system 202, RF transceiver 204, digital signal processor 208, and controller 210 may include separate components or instances dedicated to different radio communication technologies and/or unified components that are shared between different radio communication technologies. For example, in some aspects controller 210 may be configured to execute multiple protocol stacks, each dedicated to a different radio communication technology and either at the same processor or different processors. In some aspects, digital signal processor 208 may include separate processors and/or hardware accelerators that are dedicated to different respective radio communication technologies, and/or one or more processors and/or hardware accelerators that are shared between multiple radio communication technologies. In some aspects, RF transceiver 204 may include separate RF circuitry sections dedicated to different respective radio communication technologies, and/or RF circuitry sections shared between multiple radio communication technologies. In some aspects, antenna system 202 may include separate antennas dedicated to different respective radio communication technologies, and/or antennas shared between multiple radio communication technologies. Accordingly, while antenna system 202, RF transceiver 204, digital signal processor 208, and controller 210 are shown as individual components in FIG. 3, in some aspects antenna system 202, RF transceiver 204, digital signal processor 208, and/or controller 210 can encompass separate components dedicated to different radio communication technologies.

Figure 3:
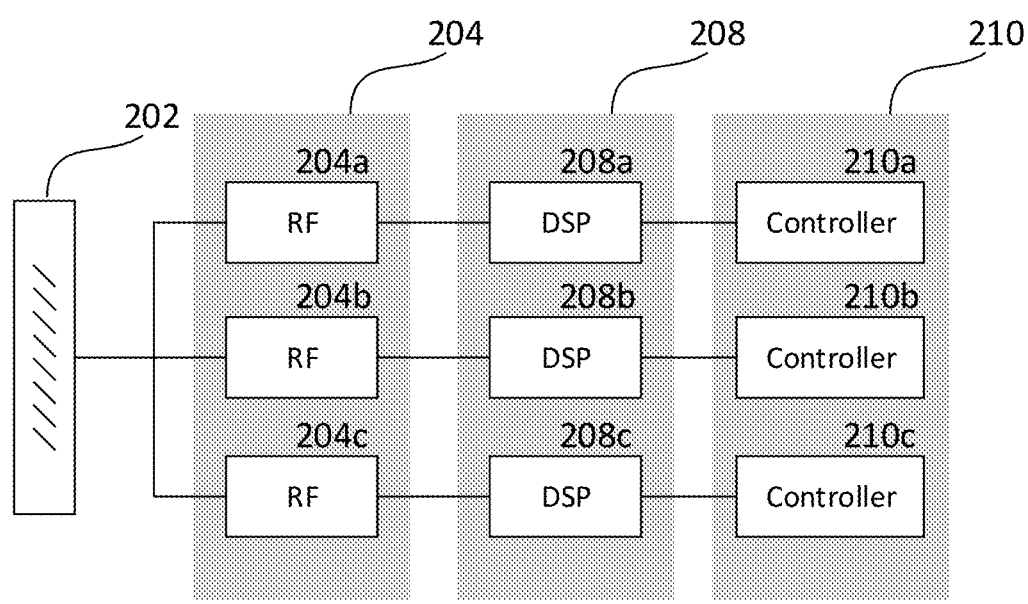
FIG. 3 shows an exemplary configuration of signal acquisition and processing circuitry according to some aspects.

FIG. 3 shows an example in which RF transceiver 204 includes RF transceiver 204a for a first radio communication technology, RF transceiver 204b for a second radio communication technology, and RF transceiver 204c for a third radio communication technology. Likewise, digital signal processor 208 includes digital signal processor 208a for the first radio communication technology, digital signal processor 208b for the second radio communication technology, and digital signal processor 208c for the third radio communication technology. Similarly, controller 210 may include controller 210a for the first radio communication technology, controller 210b for the second radio communication technology, and controller 210c for the third radio communication technology. RF transceiver 204a, digital signal processor 208a, and controller 210a thus form a communication arrangement (e.g., the hardware and software components dedicated to a particular radio communication technology) for the first radio communication technology, RF transceiver 204b, digital signal processor 208b, and controller 210b thus form a communication arrangement for the second radio communication technology, and RF transceiver 204c, digital signal processor 208c, and controller 210c thus form a communication arrangement for the third radio communication technology. While depicted as being logically separate in FIG. 4, any components of the communication arrangements may be integrated into a common component.

Terminal device 102 may also include application processor 212, memory 214, and power supply 212. Application processor 212 may be a CPU, and may be configured to handle the layers above the protocol stack, including the transport and application layers. Application processor 212 may be configured to execute various applications and/or programs of terminal device 102 at an application layer of terminal device 102, such as an operating system (OS), a user interface (UI) for supporting user interaction with terminal device 102, and/or various user applications. The application processor may interface with baseband modem 206 and act as a source (in the transmit path) and a sink (in the receive path) for user data, such as voice data, audio/video/image data, messaging data, application data, basic Internet/web access data, etc. In the transmit path, controller 210 may therefore receive and process outgoing data provided by application processor 212 according to the layer-specific functions of the protocol stack, and provide the resulting data to digital signal processor 208. Digital signal processor 208 may then perform physical layer processing on the received data to produce digital baseband samples, which digital signal processor may provide to RF transceiver 204. RF transceiver 204 may then process the digital baseband samples to convert the digital baseband samples to analog RF signals, which RF transceiver 204 may wirelessly transmit via antenna system 202. In the receive path, RF transceiver 204 may receive analog RF signals from antenna system 202 and process the analog RF signals to obtain digital baseband samples. RF transceiver 204 may provide the digital baseband samples to digital signal processor 208, which may perform physical layer processing on the digital baseband samples. Digital signal processor 208 may then provide the resulting data to controller 210, which may process the resulting data according to the layer-specific functions of the protocol stack and provide the resulting incoming data to application processor 212. Application processor 212 may then handle the incoming data at the application layer, which can include execution of one or more application programs with the data and/or presentation of the data to a user via a user interface.

Memory 214 may embody a memory component of terminal device 102, such as a hard drive or another such permanent memory device. Although not explicitly depicted in FIG. 2, the various other components of terminal device 102 shown in FIG. 2 may additionally each include integrated permanent and non-permanent memory components, such as for storing software program code, buffering data, etc.

Power supply 216 may be an electrical power source that provides power to the various electrical components of terminal device 102. Depending on the design of terminal device 102, power supply 216 may be a 'definite' power source such as a battery (rechargeable or disposable) or an 'indefinite' power source such as a wired electrical connection. Operation of the various components of terminal device 102 may thus pull electrical power from power supply 216.

In accordance with some radio communication networks, terminal devices 102 and 104 may execute mobility procedures to connect to, disconnect from, and switch between available network access nodes of the radio access network of radio communication network 100. As each network access node of radio communication network 100 may have a specific coverage area, terminal devices 102 and 104 may be configured to select and re-select between the available network access nodes in order to maintain a strong radio access connection with the radio access network of radio communication network 100. For example, terminal device 102 may establish a radio access connection with network access node 110 while terminal device 104 may establish a radio access connection with network access node 112. In the event that the current radio access connection degrades, terminal devices 102 or 104 may seek a new radio access connection with another network access node of radio communication network 100; for example, terminal device 104 may move from the coverage area of network access node 112 into the coverage area of network access node 110. As a result, the radio access connection with network access node 112 may degrade, which terminal device 104 may detect via radio measurements such as signal strength or signal quality measurements of network access node 112. Depending on the mobility procedures defined in the appropriate network protocols for radio communication network 100, terminal device 104 may seek a new radio access connection (which may be, for example, triggered at terminal device 104 or by the radio access network), such as by performing radio measurements on neighboring network access nodes to determine whether any neighboring network access nodes can provide a suitable radio access connection. As terminal device 104 may have moved into the coverage area of network access node 110, terminal device 104 may identify network access node 110 (which may be selected by terminal device 104 or selected by the radio access network) and transfer to a new radio access connection with network access node 110. Such mobility procedures, including radio measurements, cell selection/reselection, and handover are established in the various network protocols and may be employed by terminal devices and the radio access network in order to maintain strong radio access connections between each terminal device and the radio access network across any number of different radio access network scenarios. Or, for example, terminal devices 102 or 104 may seek to switch to enhanced coverage from normal coverage if the respective network access node on which they are camped on supports enhanced coverage. By switching to enhanced coverage mode, terminal device 102 or 104 may increase the repetition in signaling with their respective network access node and/or increase signal transmission power to improve communications.

Figure 4:
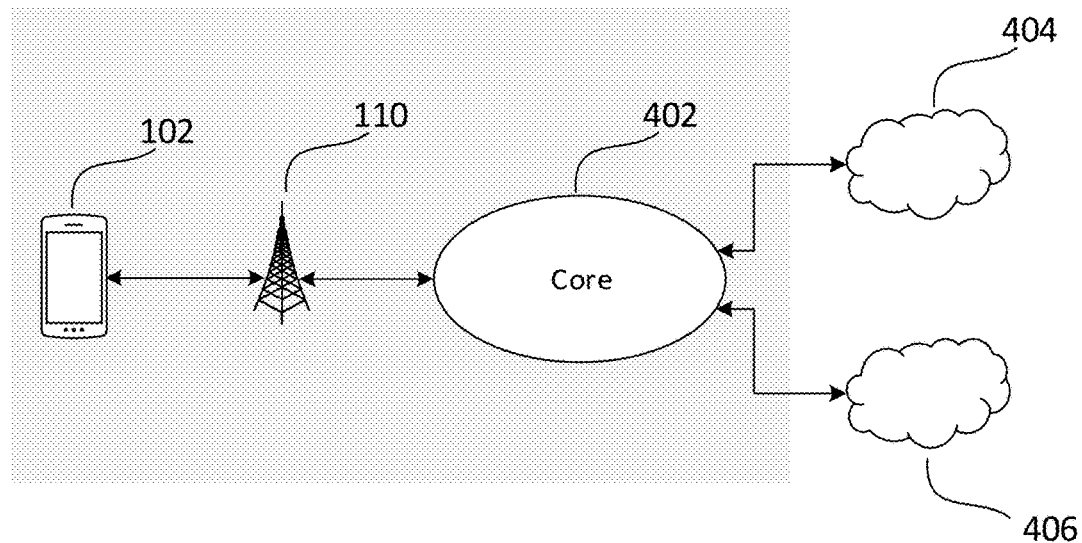
FIG. 4 shows an exemplary configuration of a network access node interfacing with core network according to some aspects.

As previously indicated, network access nodes 110 and 112 may interface with a core network. FIG. 4 shows an exemplary configuration in accordance with some aspects where network access node 110 interfaces with core network 402, which may be a cellular core network. Core network 402 may provide a variety of functions essential to operation of radio communication network 100, such as data routing, authenticating and managing users/subscribers, interfacing with external networks, and various network control tasks. Core network 402 may therefore provide an infrastructure to route data between terminal device 102 and various external networks such as data network 404 and data network 406. Terminal device 102 may thus rely on the radio access network provided by network access node 110 to wirelessly transmit and receive data with network access node 110, which may then provide the data to core network 402 for further routing to external locations such as data networks 404 and 406 (which may be packet data networks (PDNs)). Terminal device 102 may therefore establish a data connection with data network 404 and/or data network 406 that relies on network access node 110 and core network 402 for data transfer and routing.

The methods and devices of this disclosure provide improved performance for non-bandwidth reduced low complexity (non-BL) UEs supporting the LTE coverage enhancement feature, especially in scenarios where normal coverage quality may be reduced, e.g. near a cell edge (e.g. near the boundaries of 111 or 121), in an elevator or underground structure, etc. The disclosure herein provides cell selection and cell reselection optimization algorithms, thus enabling faster and more efficient cell selection and reselection in low coverage quality scenarios.

For example, if network 100 is configured to support LTE communications, network access nodes 110 and 120 may be eNodeBs configured to support coverage enhancement.

With the introduction of the 3GPP Release 13 Coverage Enhancement (CE) feature, a UE can be camped on a cell under normal coverage or enhance coverage, e.g. UE 102 on cell 111 in FIG. 1. A cell may be configured to support the enhanced coverage functionality in addition to the normal coverage functionality. This enhanced coverage support is indicated in the master information block (MIB) broadcast by an eNodeB, e.g. 110 in FIG. 1. The MIB is broadcast by the eNodeB to users within its cell to provide important system information, e.g. system bandwidth, Physical Hybrid-ARQ Indication Channel (PHICH) information, system frame number information, enhance coverage information, etc. One of the important parameters broadcast by the MIB is system information block (SIB) scheduling information for SIB1, SIB2, etc. For enhanced coverage, the eNodeB also transmits SIBs known as SIB-Bandwidth Reduced (SIB-BR), e.g. SIB1-BR-r13, i.e. SIB1-BR, in addition to normal SIBs, and may apply the following cell selection and reselection criteria.

A UE camped on a cell in enhanced coverage (EC) mode may receive a higher number of repetitions of messages in the downlink as compared to a UE camped in normal coverage (NC mode). Also, a UE camped on a cell in EC mode may have a coverage enhancement of up to 15 dB with reference to a UE in NC mode and set its transmission power for both Physical Uplink Control Channel (PUCCH) and Physical Uplink Shared Channel (PUSCH) to the maximum. The EC mode is designed to be used in poor signal propagation conditions (e.g. near cell edge, in an elevator, subterranean structures, etc.) in order to increase likelihood of signal transmission, albeit at a cost in power.

As per 3GPP TS 36.331, a UE in EC mode only acquires SIB1-BR and SI-BR, elsewise, it only acquires legacy SIB1 and SI. In other words, E-UTRAN mandatory configures CellSelectionInfoCE field only in SIB1-BR and not in SIB1, and optionally configures CellSelectionInfoCE field in SIB3/5-BR and in SIB3/5. As per 3GPP TS 36.304 for a UE in CE, if cell selection criterion S is not fulfilled for a cell in normal coverage, the UE shall consider itself to be in enhanced coverage if the cell selection criterion S for enhanced coverage is fulfilled. Coverage specific values Qrxlevmin_CE and Qqualmin_CE are only applied for the suitability check in enhanced coverage, i.e. they are not used for measurement and reselection thresholds. Ranking for cell selection criterion S for enhanced coverage is applied for intra-frequency and inter-frequency cell reselection when the current serving cell can only be accessed using enhanced coverage.

As described above, a UE will not complete the cell selection process unless the cell selection criteria, S, is fulfilled; that is, both the Srxlev>0 and the Squal>0, and are calculated follows:

$$Srxlev = Qrxlevmeas - (Qrxlevmin + Qrxlevminoffset) - Pcompensation \quad (1)$$

$$Squal = Qqualmeas - (Qqualmin + Qqualminoffset) \quad (2)$$

wherein Srxlev is the cell selection reception (Rx) level value in dB; Squal is the cell selection quality value in dBm; Qrxlevmeas is the measured cell Rx level value (Reference Signal Received Power (RSRP) received from the SIBs); Qqualmeas is the measure cell quality value (Reference Signal Received Quality (RSRQ) received from the SIBs); Qrxlevmin is the minimum required Rx level in the cell in dBm (i.e. the minimum RSRP signaled within SIB-1); Qrxlevminoffset is the offset to the signaled Qrxlevmin taken into account in the Srxlev evaluation when the UE is camped on a Visited Public Land Mobile Network (VPLMN); Qqualminoffset is the offset to the signaled Qwualmin taken into account in the Squal evaluation when the UE is camped on a VPLMN; and Pcompensation is max (P_EMAX-P_PowerClass, 0) in dBm, wherein P_EMAX is the maximum transmission (Tx) power level a UE may use when transmitting on the uplink the cell in dBm and P_PowerClass is the maximum RF output power of the UE in dBm.

However, the aforementioned cell selection and reselection methods experience numerous problems. First, they provide for acquiring SIB1-BR and other SI-BR only when in enhanced coverage, resulting in slow acquisition of the SIB-BRs and increased camping and neighbor cell measurement configuration times compared to normal coverage. Second, a UE camped on a cell in normal coverage is not aware of SI modification of the SIBs of the same cell in enhanced coverage, and vice versa. Third, the UE may frequently transition between normal coverage and enhanced coverage on the same cell if the power levels of the respective modes (i.e. normal and EC) fluctuates, resulting in a ping-pong effect between both modes. Fourth, if the network does not configure CellSelectionInfoCE in SIB3/5 or in SIB3/5-BR, then the UE will be unaware if a neighboring cell supports EC. This may result in the UE reporting to be out of service (OOS) even if a cell with EC is available. The only way a UE would be able to camp on this cell in EC mode would be through initial cell selection. Fifth, there is no provision provided to account for reselection preference to normal coverage over enhanced coverage. Sixth, the maximum size of SIB1-BR and other SIB-BRs is 960 bits, while the maximum size of SIB1 and other SIBs is much greater than 960 bits. Accordingly, it is possible that SIB-BR does not include at least some information available in SIBs. For example, SIB5-BR may only include EUTRA Absolute radio-frequency channel numbers (EARFCNs) where enhanced coverage is deployed and exclude other EARFCNs, or, SIB5/6/7/8-BR may reduce the number of neighbor frequencies to reduce the size compared to SIB5/6/7/8, so a UE in CE mode may not have all neighbor frequency information available from the network.

The methods and devices of this disclosure provide solutions to these problems by exploiting bandwidth reduced system information (SI-BR), combining SI and SI-BR, and providing for improved reselection algorithms.

When camped in normal mode, the methods and devices of this disclosure are configured to exploit SI-BR by also acquiring SIB1-BR (and other SI-BR) and read MTC physical downlink control channel (MPDCCH) paging. By doing so, the transition from camping on normal mode to enhanced coverage is seamless with the help of already available system information which has been read and cached by the UE. Additionally, this will result in power saving as acquiring SIB1-BR and other SI-BR in normal coverage conditions consumes less battery compared to acquiring the same information in enhanced coverage conditions.

When camped in EC mode, the methods and devices of this disclosure are configured to save neighbor cell SI of normal mode and combine it with neighbor cell SI of EC mode for enabling measurements. Accordingly, this will result in faster reselection to a normal mode cell by avoiding OOS in some cases.

Additionally, the methods and devices of this disclosure are configure to provide for improved reselection algorithms from normal coverage to enhanced coverage based on frequent power fluctuations in either mode by introducing S-criteria thresholds and/or timers, thereby saving UE power by avoiding ping-ponging between both modes. Furthermore, the reselection algorithms described herein provides an internal stored list search (for enhance coverage cells) when the OOS timer is running and no cell for either normal or enhanced coverage is detected as per SIB configuration.

For comparative purposes, the methods and devices of this disclosure provide the following improvements and/or enhancements over existing known methods.

First, when a UE is camped in normal mode in existing methods defined by the 3GPP, the UE only acquires SIB1 and SI and only monitors paging on PDCCH, i.e. there is no acquisition of SI-BR or monitoring of MPDCCH. The UEs of this disclosure, when camped in normal mode, are further configured to, in addition to acquiring normal SI (i.e. SIBs), acquire SIB1-BR and other SI-Br and/or monitor both PDCCH and MPDCCH for SI modifications.

Second, when a UE is camped in EC mode in existing methods as defined by the 3GPP, a UE uses neighbor cell SI of SI-BR for measurements. The UEs of this disclosure, when camped in EC mode, are further configured to implement saved neighbor cell SI of normal mode in addition to SI-BR for measurements.

Third, as defined by the 3GPP, existing implementations provide that when normal coverage S criteria is not satisfied, to check the EC S criteria. In order to avoid the ping-pong effect that is likely to result from reception power fluctuations, the UEs of this disclosure are configured to implement a threshold and/or timer to determine whether the normal coverage S criteria is satisfied prior to checking EC S criteria. And when camped in EC mode, the UEs of this disclosure are configured to determine whether normal coverage S criteria is satisfied for a predetermined number of times prior to triggering reselection from EC to normal coverage.

Fourth, existing methods as defined by the 3GPP provide no internally stored search list for CE cells. The UEs of this disclosure are configured with an algorithm providing a provision for an internally stored search list for CE cells when OOS timer is running and no cell for normal coverage or enhanced coverage is detected as per SIB configuration.

Figure 5:
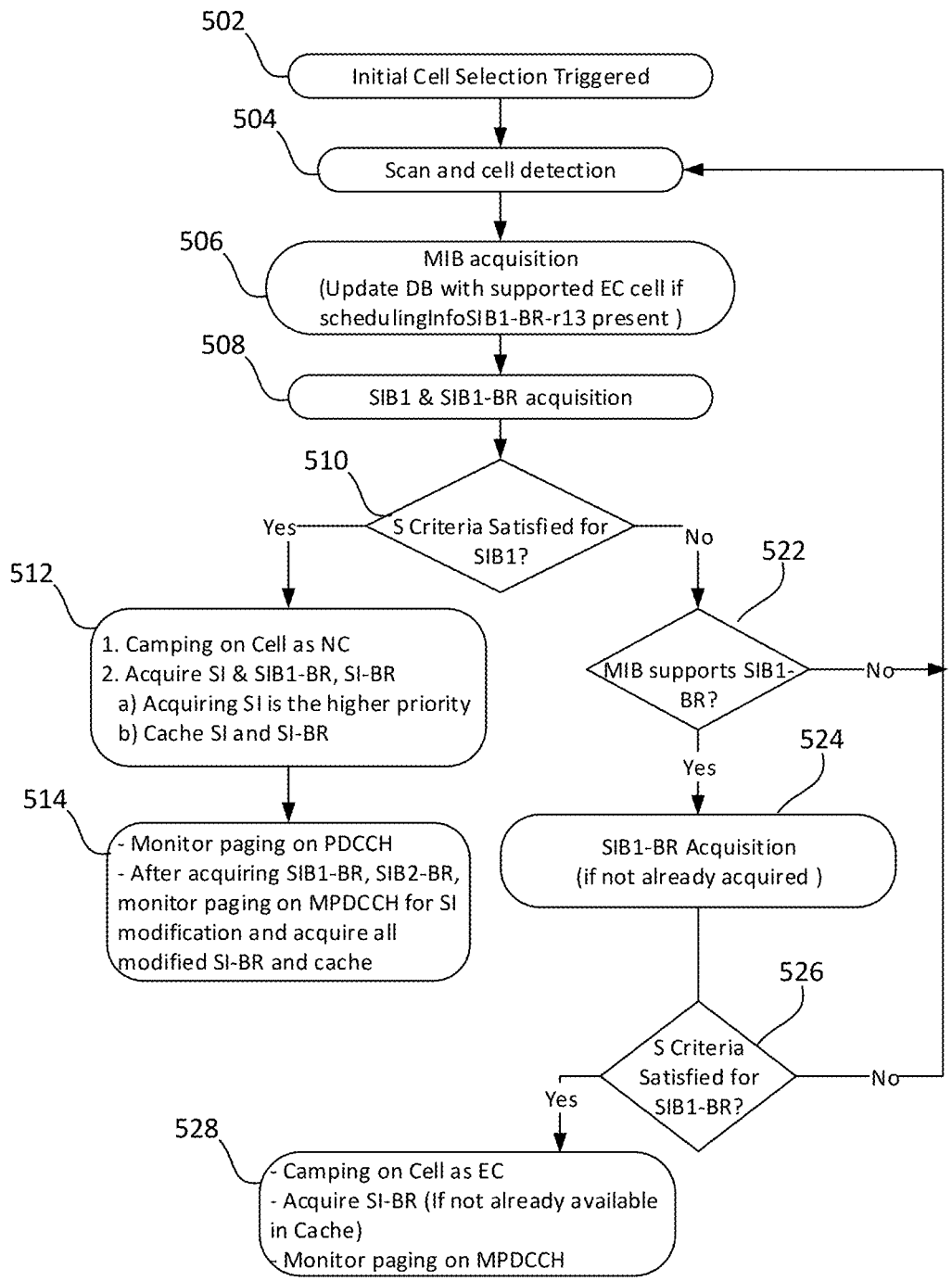
FIG. 5 shows an exemplary flowchart for initial cell selection according to some aspects.

FIG. 5 is a flowchart 500 describing a method for initial cell selection accounting for enhanced coverage in aspects of this disclosure. It is appreciated that flowchart 500 is exemplary in nature and may thus be simplified for purposes of this explanation.

The methods and algorithms as described by flowchart 500 provide an improved initial cell selection algorithm which reads the cell's broadcasted SIB1 and SI-BR either in parallel or in succession and camps on a cell in either Normal Coverage (NC) mode or Enhanced Coverage (EC) mode. If camped on a cell in NC, the UE acquires SIB1-BR, SI-BR and caches it, monitors paging on both PDCCH and MPDCCH, and keeps SIB1-BR and SI-BR up to date on SI modification on MPDCCH. These improved methods and algorithms allow for a more seamless transition from NC to EC in addition to saving power at the UE, and, also, allowing the UE to stay up to date on modifications of parameters in the other mode from that which it is camped on.

Upon triggering an initial cell selection 502, the UE performs a scan of supported frequencies and detects cells on which to camp on 504. This initial cell selection may be triggered in any conventional manner, e.g. powering on a device, transitioning from OOS, etc. After performing the cell search, i.e. reception of Primary Synchronization Signal (PSS) and the Secondary Synchronization Signal (SSS) along with Reference Signal and Physical Broadcast Channel Detection, the UE acquires the master and system information of the detected cells. Upon acquiring the Master Information Block (MIB) 506, the UE is configured to determine if the detected cell(s) support enhanced coverage (EC) by receiving the schedulingInfoSIB1-BR-r13 in the MIB. If the UE receives this information, it is configured to update a database (stored in a UE memory) with the corresponding EC supported cell.

The UE is configured to acquire SIB1 and SIB1-BR 508 after determining that the cell supports EC. This may be done in parallel, or, in another aspect of this disclosure, the UE may be configured to acquire the SIB1 and the SIB1-BR sequentially, that is, acquire the SIB1 first, and then acquire the SIB1-BR (either prior to, during, or after determining whether the S criteria is satisfied for SIB1 in 510). Nevertheless, both SIB1 and SIB1-BR are acquired after determining that the cell supports EC from the MIB, and subsequently cached.

In any of these cases, the S criteria for the one or more detected cells is calculated from the SIB1(s) and it is determined whether the S criteria is satisfied 510. If at least one of the S criteria is satisfied, the UE is configured to camp on the cell in NC mode 512. If the SIB1-BR has not yet been acquired (i.e. the SIB-BR is not acquired in parallel, but sequentially, with the normal SIBs), then the SIB1-BR is acquired in this step in addition to acquiring the other SI, i.e. SIB2, SIB3, etc. Additionally, other SI-BR may be acquired, i.e. SIB2-BR, SIB3-BR, etc. If camped on normal mode as in 512, the acquisition of the SI is assigned a higher priority than the acquisition of SI-BR. As the SI and SI-BR are acquired, the information is cached.

Also, in addition to monitoring paging on the PDCCH, after acquiring SIB1-BR and SIB2-BR, the UE is configured to monitor paging on the MPDCCH for SI-BR modifications and acquire all modified SI-BR and cache it 514.

If the S criteria is not satisfied for the acquired SIB1(s) in 510, then wherein it was determined that the cell supports EC 522 (i.e. from MIB acquisition 506), the SIB1-BR may be acquired if not already previously acquired 524, either in parallel with SIB1 acquisition, immediately after SIB1 acquisition, during S criteria evaluation for SIB1, i.e. at any prior point. Accordingly, in an aspect of this disclosure, 524 is optional if the SIB1-BR has already been acquired as previously discussed.

The satisfaction of S criteria for the acquired SIB1-BR(s) is then determined 526 in order for the UE to select a cell to camp on in EC mode 528.

Figure 6:
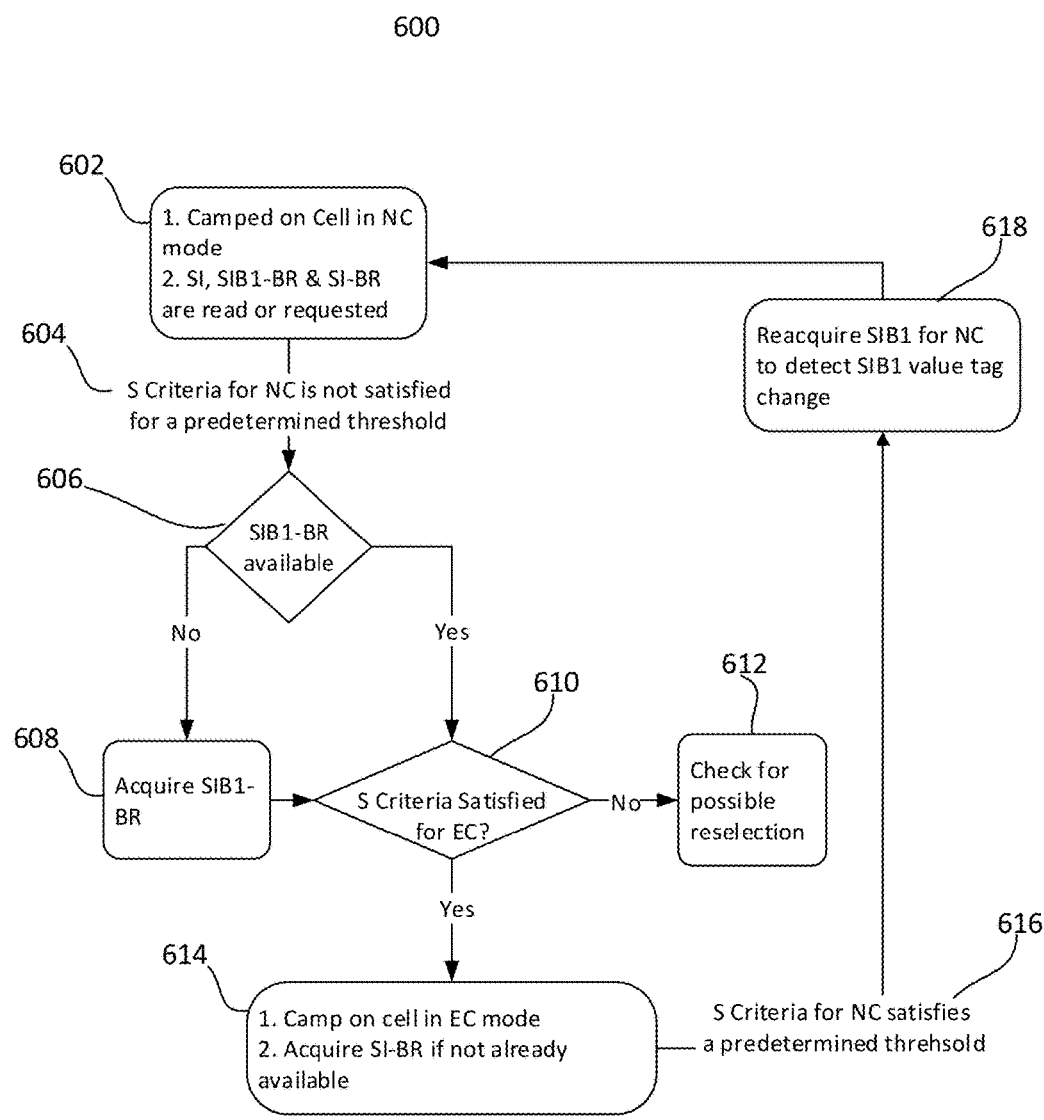
FIG. 6 shows an exemplary flowchart for transitioning between normal coverage and enhanced coverage according to some aspects.

FIG. 6 is a flowchart 600 describing an algorithm for transitioning between NC and EC while camped on a cell in aspects of this disclosure. It is appreciated that flowchart 600 is exemplary in nature and may thus be simplified for purposes of this explanation.

Flowchart 600 represents an algorithm for transitioning back and forth between NC and EC modes. One of the benefits of this algorithm is that it accounts for a serving cell's power level fluctuations. The algorithm and method described by flowchart 600 considers that the S criteria should be satisfied (or not satisfied, depending in which direction the transition is occurring) for a predetermined threshold amount, which may be either a number of attempts (e.g. Nsery number of times as per 3GPP TS 36.133 or some other value) or a period of time (e.g. according to an OOS timer or some other value) to avoid a ping-pong effect between both modes. Accordingly, flowchart 600 provides for greater power savings and an improved end user experience.

It is appreciated that depending on whether the UE is initially in NC or EC, the process described in flowchart 600 may start in 602 or 614, respectively. For purposes of this explanation, it will be assumed that the UE is initially in NC.

In 602, the UE is camped on NC. While camped on NC, the UE acquires both SI and SI-BR, e.g. SIB1 and SIB1-BR, either in parallel or sequentially (as previously detailed). Accordingly, the UE may cache information acquired from both the SIBs and the SIBs-BR for future potential use.

While camped on NC mode, the UE may continuously monitor the S criteria, i.e. the signal quality and reception levels of the camped-on cell, and monitor whether the S criteria is not satisfied for a predetermined threshold 604. This predetermined threshold may be a number of times the S criteria does is not satisfied (e.g. Nsery times), or a certain duration of time during which the S criteria is not satisfied (e.g. OOS timer). Nsery may be calculated based on the discontinuous reception (DRX) cycle length and may be, for example, 2-4 times, and the OOS timer may be an OOS timer that lasts for up to 10 seconds, for example.

In this manner, the UE will not attempt to camp on EC mode after a single (or more, depending on the predetermined threshold selected) failed S criteria in NC mode. Minor power fluctuations in signal transmission may lead to isolated failed S criteria determinations, and even though the cell is still more than suitable for camping on in NC mode, the UE may attempt to camp on EC mode. Accordingly, by implementing the methods and algorithms of this disclosure, a UE will resist switching to EC mode until the predetermined threshold (i.e. number of times or duration in time) for failed S criteria is satisfied.

Upon the S criteria for NC not being satisfied for the predetermined threshold 604, the UE determines whether the SIB1-BR is available 606. More likely than not, the SIB1-BR and any modifications thereof will already have been received and cached by the UE (as in FIG. 5), and accordingly, the UE directly proceeds to determining whether the S criteria for EC is satisfied 610. However, in the case where the UE has not yet successfully acquired the SIB1-BR, the SIB1-Br is acquired 608 before proceeding to 610

If the S criteria is not satisfied for EC, the UE may check for possible reselection to another cell 612. If the S criteria is satisfied for EC, the UE may camp on the cell in EC mode 614, and acquire further SI-BR if not already acquired as detailed in FIG. 5.

While camped on the cell in EC mode 614, the UE is configured to monitor the S criteria for NC mode, wherein when the S criteria is satisfied for a predetermined threshold (which may by the same as the predetermined threshold used in 604) 616, the UE may transition back to NC mode by reacquiring SIB1 to detect SIB1 value tag changes 618. By determining whether the S criteria is satisfied for the predetermined threshold 616 (e.g. for Nsery times), the UE avoids the situation where it transitions back to NC based on a small spike in signal power, wherein camping in NC mode on the cell is still impractical. Accordingly, the UE is configured to determine the sustainability of reverting back to NC mode prior to preemptively camping in NC mode only to discover that the cell conditions are more suitable for EC mode.

Figure 7:
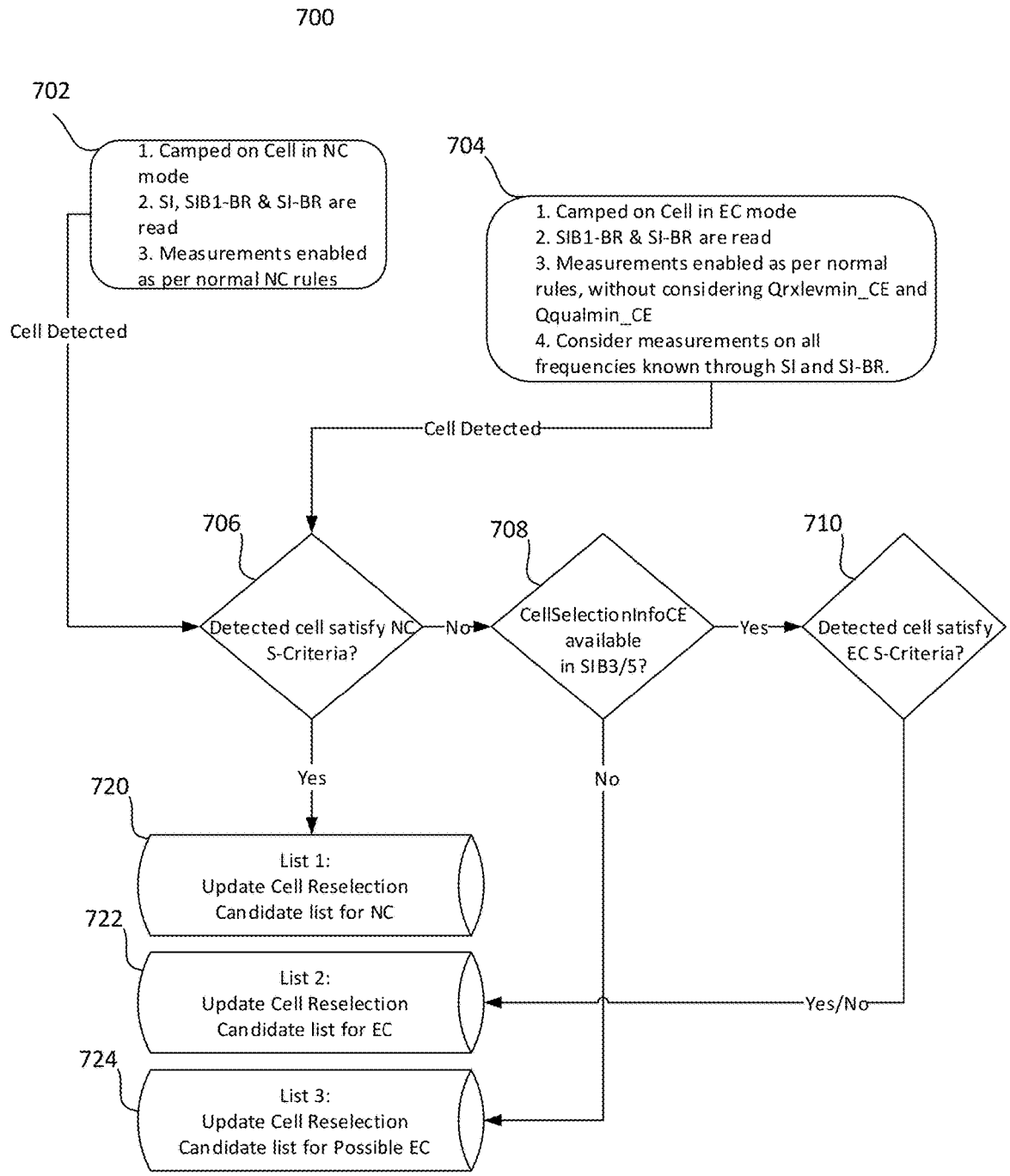
FIG. 7 shows an exemplary flowchart for cell reselection preparation according to some aspects.

FIG. 7 is a flowchart 700 describing cell reselection preparation taking CE into consideration in aspects of this disclosure. It is appreciated that flowchart 700 is exemplary in nature and may thus be simplified for purposes of this explanation.

Figure 8:
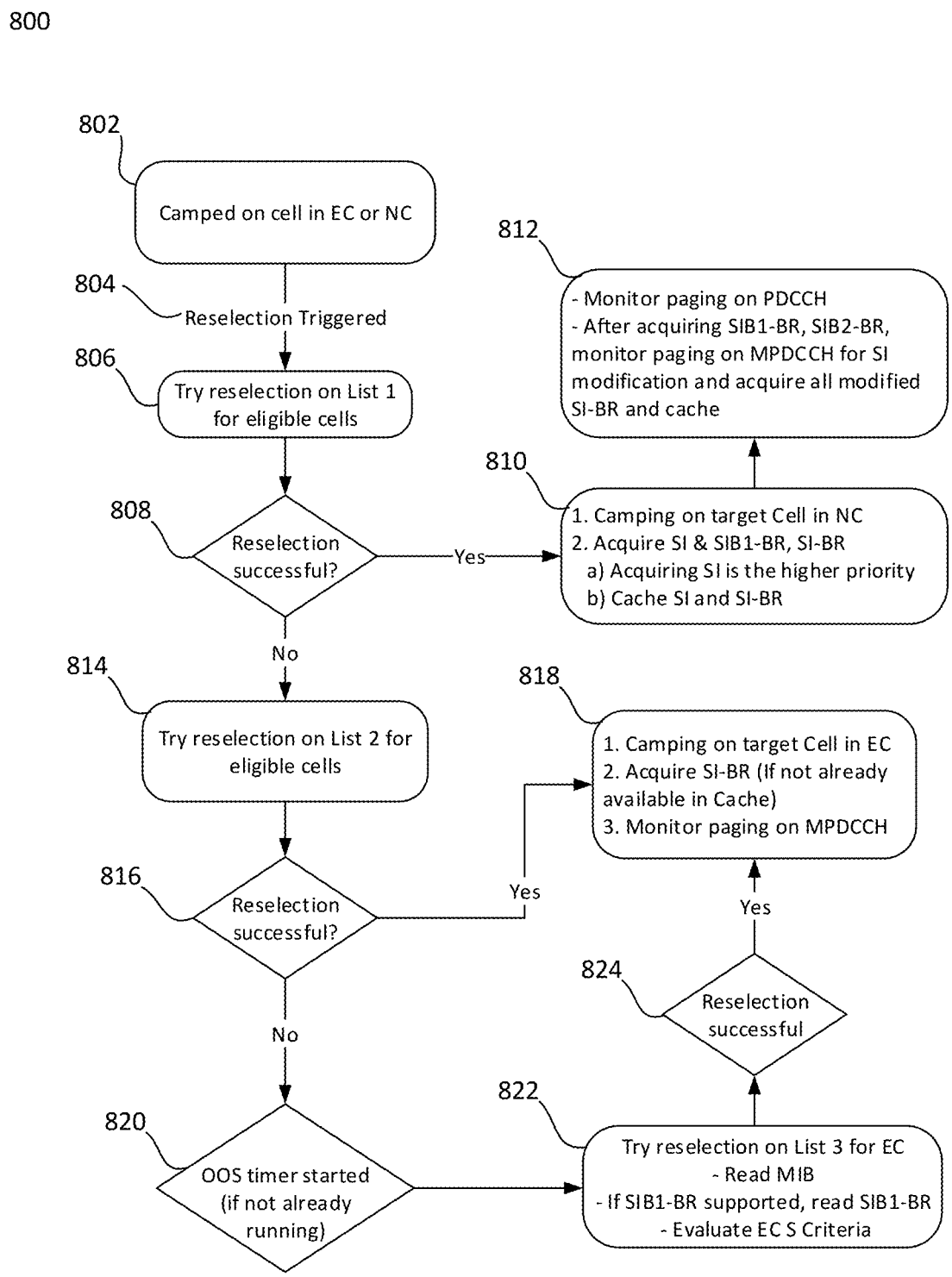
FIG. 8 shows an exemplary flowchart for cell reselection implementation according to some aspects.

Flowchart 700 describes the preparation of the cell selection methods and algorithms in this disclosure, wherein the cell selection is executed by the methods and algorithms presented in FIG. 8. The methods and algorithms described in FIG. 7-8 provide numerous advantages. One advantage, for example, if a network does not configure CellSelectionInfoCE in SIB3/5 or SIB3/5-BR, then a UE implementing the methods and algorithms of this disclosure would still be configured to determine whether a neighbor cell supports CE, thereby avoiding triggering OOS procedures as would a UE not configured as described in this disclosure. Conventionally configured UEs would only be able to camp to the EC cell by triggering an initial cell selection. Second, provisions for reselection preference (i.e. reselection priority) are provided to prefer a normal coverage cell over an enhanced coverage cell. Third, the methods and algorithms presented herein account for the size differences between SIBs and SIBs-BR. For example, the maximum size of SIB1-BR and SI-BR is 960 bits, while the maximum size of SIB1 and SI is much greater. Therefore, it is possible that the SI-BR does not include at least some information available in SI, for example: SIB5-BR may include EARFCNs employing CE and exclude other EARFCNs, or SIB5/6/7/8-BR may reduce the number of neighbor frequencies to reduce the size compared to SIB5/6/7/8. The methods and algorithms described herein provide a UE (especially when in CE mode) to have a greater amount of neighbor frequencies available from the network.

The methods and algorithms described herein can be initiated with a UE being camped on a cell in NC mode 702 or in EC mode 704. If camped on NC 702, the UE is configured to read SI, and also read SIB1-BR and SI-BR.

The bandwidth reduced system information blocks (SIBs-BR) may be acquired in parallel with the SIBs, or the SIBs-BR may be acquired in sequence after the SIBs are acquired. Normal NC measurement rules may be enabled. These rules may be based off of Sections 5.2.3.2 and/or 5.2.4.2 of 3GPP TS 36.304, for example. If camped on EC 704, the SIB1-BR and SI-BR are read, and normal EC measurement rules may be enabled, without considering Qrxlevmin_CE and Qqualmin_CE. Additionally, the UE is configured to consider measurements on all frequencies known through both SI and SI-BR, not just the SI-BR as currently employed by conventional methods.

Upon detecting a cell in either NC mode or EC mode, the UE determines whether the detected cell satisfies S criteria in NC 706. If it is satisfied, the cell in NC is added to List 1 720, which includes cells for updated cell selection candidates in NC mode. In List 1, NC reselection rules apply, e.g. based on ranking or priority as outlined in Section 5.2.4.5 (priority based) and 5.2.4.6 (ranking if equal priority) of 3GPP TS 36.304. If the detected cell does not satisfy the S criteria in NC mode 706, the UE checks the availability of CellSelectionInfoCE in SIB3/5 708. If it not available, then the cell added to List 3 724 which contains a candidate list for possible cells in EC mode. If the CellSelectionInfoCE in SIB3/5 708 is available, the detected cell's EC mode S criteria is evaluated 710. Regardless of whether the EC S criteria is satisfied or not, the cell in EC mode is added to List 2 722, which contains candidates for cells in EC mode. However, is the EC mode S criteria was satisfied 710, the cell in EC mode is ranked higher in the List 2 than if the S criteria had not been satisfied. EC cells are ranked in List 2 according to EC reselection rules, e.g. according to the reselection for EC rankings as per Section 5.2.4.6a of 3GPP TS 36.304 (the frequency priority is ignored, and the existing ranking is applicable as per Section 5.2.4.6).

FIG. 8 is a flowchart 800 showing an algorithm for when a cell reselection is triggered according to some aspects. It is appreciated that flowchart 800 is exemplary in nature and may thus be simplified for purposes of this explanation. The methods and algorithm depicted by flowchart 800 may employ the lists, i.e. List 1, 2, and/or 3, assembled in FIG. 7.

Once reselection is triggered 804 in a UE camping on either NC or EC mode 802 (e.g. S criteria fails in NC mode), the UE will attempt reselection according to eligible cells in List 1 806. If reselection to one these cells is successful 808, i.e. according to the reselection (ranking or priority based) rules for cells in NC mode, the NC cell is targeted, and the UE camps on the target cell in NC mode 810. Once camped on the target cell in NC mode, the UE may acquire SI, SIB1-BR and SI-BR in parallel or in sequence (as previously described), prioritizing the acquisition of SI over SI-BR and caching the acquired information. And, in addition to monitoring paging on PDCCH, the UE is configured to also monitor paging on MPDCCH for SI-BR modification and acquire and cache all the modified SI-BR 812.

If reselection according to any of the eligible cells in List 1 is not successful 808, the UE attempts to reselect to eligible cells in List 2 814. If attempts at reselection to one of these EC cells is successful 816, the EC cell is targeted, and the UE camps on the target cell in EC mode 818 and acquires the SI-BR if not already available in cache and monitors paging on MPDCCH. If attempts at reselection to one of these EC cells is not successful in 816, the UE triggers an Out of Service (OOS) timer 820 if it has not already been started, e.g. the 10 s OOS timer may have started when reselection is initially triggered in 804. Upon failing to detect a cell during the OOS timer, and before the expiration of the OOS timer, the UE is configured to attempt reselection according to one of the EC candidate cells in List 3 822. The MIB for a target cell in List 3 is acquired, and the SIB1-BR is read if EC is supported. If the S criteria for this EC cell is satisfied, then reselection to this EC Cell is successful 824, and the currently camped on EC cell may be added to List 2. The UE may be configured to attempt reselection according to one of the candidate EC candidate cells in List 3 when the timer is at about the halfway point or more, e.g. when about 20, 30, or 40% of the time on the timer remains.

In another aspect of this disclosure, the OOS timer is started when reselection is initially triggered in 804, and the UE may be configured to attempt reselection according to one of the candidate EC cells in List 2 at a certain point of the OOS timer if the UE fails to connect with any of the eligible cells in List 1. The certain point may be, for example, when either about 50%, 40%, 30%, or 20% time remains on the OOS timer.

Figure 9:
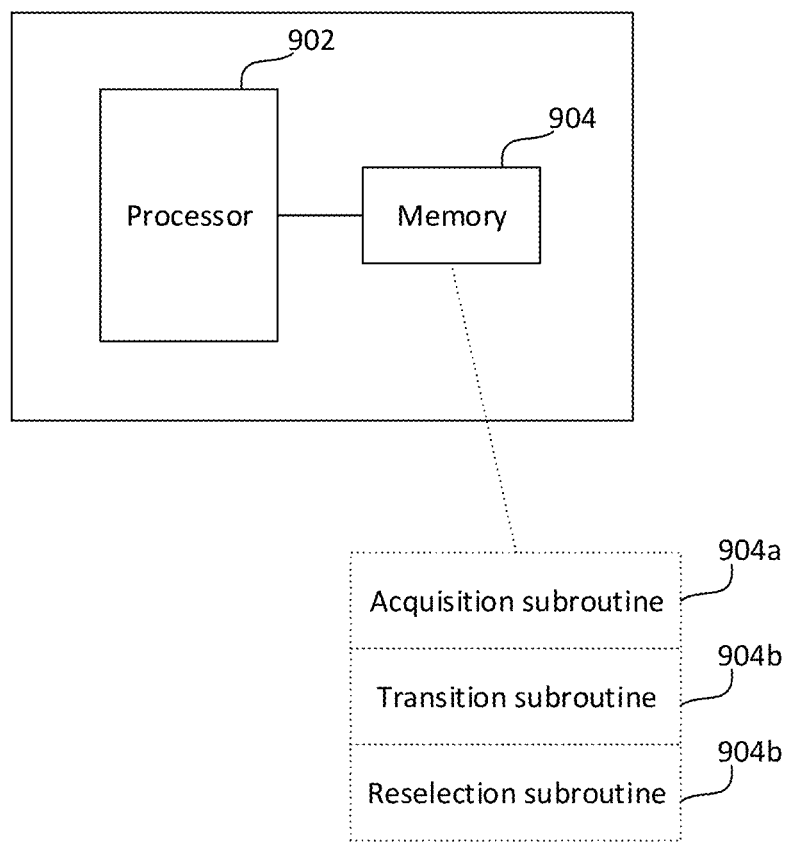
FIG. 9 shows an exemplary internal configuration of a controller configured to according to some aspects.

FIG. 9 shows an exemplary internal configuration of controller 210 according to some aspects, which may be included in a UE to implement the methods and algorithms of this disclosure. As shown in FIG. 9, controller 210 may include processor 902 and memory 904. Processor 902 may be a single processor or multiple processors, and may be configured to retrieve and execute program code to perform the transmission and reception, channel resource allocation, and cluster management as described herein. Processor 902 may transmit and receive data over a software-level connection that is physically transmitted as wireless radio signals by digital signal processor 208, RF transceiver 204, and antenna system 202. Memory 904 may be a non-transitory computer readable medium storing instructions for one or more of an acquisition subroutine 904*a*, a transition subroutine 904*b*, and/or a reselection subroutine 904*c*.

Acquisition subroutine 904*a*, transition subroutine 904*b*, and reselection subroutine 904*c* may each be an instruction set including executable instructions that, when retrieved and executed by processor 902, perform the functionality of controller 210 as described herein. In particular, processor 902 may execute acquisition subroutine 904*a* to acquire and cache both SI and SI-BR as described in FIG. 5; processor 902 may execute transition subroutine 904*b* to transition between NC and EC in a cell as described in FIG. 6; and/or processor 902 may execute reselection subroutine 904*c* to perform reselection according to FIGS. 7 and 8. Each of acquisition subroutine 904*a*, transition subroutine 904*b*, and reselection subroutine 904*c* may further include any functionality of for a UE as algorithmically described above in prose.

By executing one or more of acquisition subroutine 904*a*, transition subroutine 904*b*, or reselection subroutine 904*c*, UE 102 is configured for seamless transitioning between NC and EC modes while also saving on power, and thereby, improving the end user experience.

Figure 10:
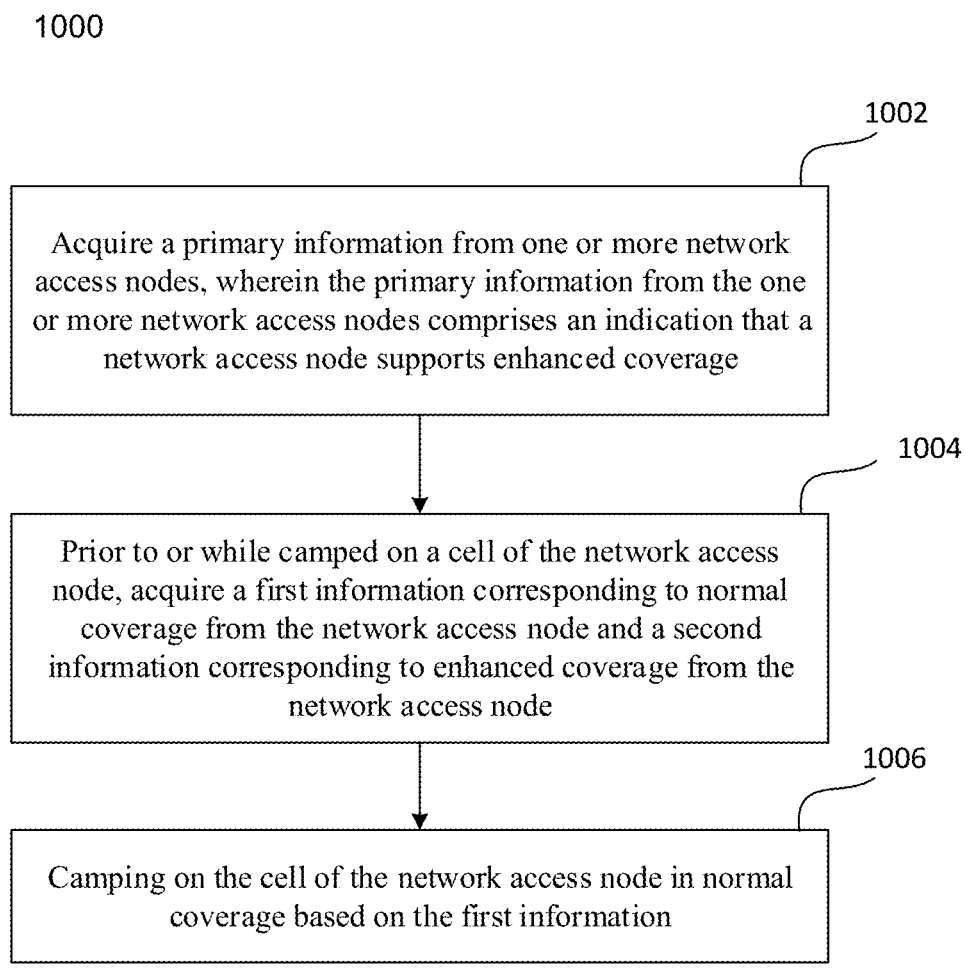
FIG. 10 shows an exemplary flowchart for acquiring information for normal and enhanced coverage according to some aspects.

FIG. 10 shows a flowchart 1000 for acquiring information for normal and enhanced coverage according to some aspects. It is appreciated that flowchart 1000 is exemplary in nature and may thus be simplified for purposes of this explanation.

Upon an initial cell selection being triggered, the communication device scans and detects cells in order to acquire a primary information from one or more network access nodes, wherein at least one primary information from a respective network access node comprises an indication that the respective network access node supports enhanced coverage 1002. This primary information may be, for example, a MIB with a schedulingInfoSIB1-BR-r13 message, and enhanced coverage may include at least one of a higher rate of signaling or an increase in signal transmission power between the communication device and the respective network access node.

Prior to or while camped on a cell of the network access node, the communication device acquires a first information corresponding to normal coverage from the respective network access node and a second information corresponding to enhanced coverage from the network access node 1004. The first information may be one or more SIBS, including at least one SIB1, and the second information may be one or more SIBs-BR, including at least one SIB1-BR.

The communication device also camps on a cell of the network access node in normal coverage based on the first information 1006. Even though camping on the cell in normal coverage, the communication device continues to acquire information relating to enhanced coverage and monitors the paging on MPDDCH.

Figure 11:
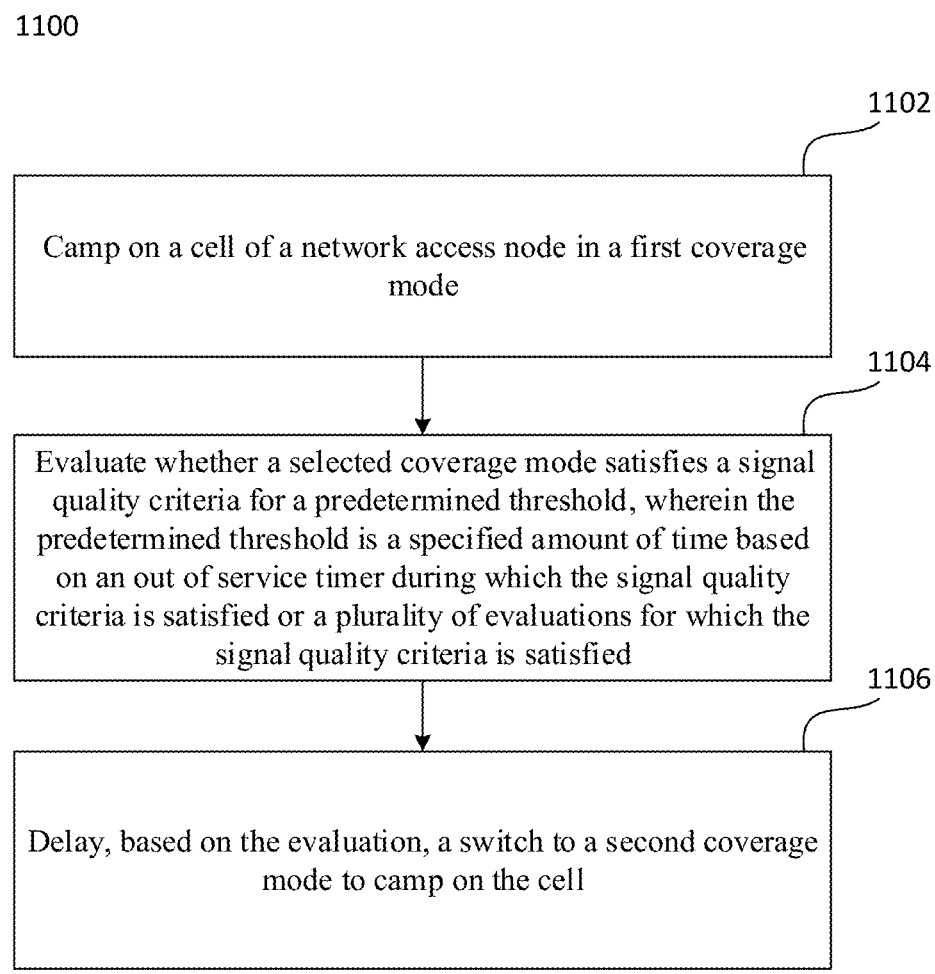
FIG. 11 shows an exemplary flowchart for transitioning between a first mode and a second mode when camping on a cell according to some aspects.

FIG. 11 shows a flowchart 1100 for transitioning between a first mode and a second mode when camping on a cell according to some aspects. It is appreciated that flowchart 1100 is exemplary in nature and may thus be simplified for purposes of this explanation.

While camped on a cell in a first coverage mode 1102, and prior to switching to the second coverage mode 1106, an evaluation is performed to determine whether a selected coverage mode meets a signal criteria for a predetermined threshold 1104. In one aspect, if transitioning from normal coverage to enhanced coverage, if the selected coverage mode (i.e. the first coverage mode, i.e. normal coverage) does not meet the signal criteria for a predetermined threshold (e.g. a specified amount of time, or number of attempts), then the coverage is switched to the second coverage mode, i.e. enhanced coverage. However, if the signal criteria for a predetermined threshold is met, then the communication device remains in normal coverage. In another aspect, if transitioning from enhanced coverage (in this case, the first coverage mode) to normal coverage (in this case, the second coverage mode), if the selected coverage mode (i.e. normal coverage, in this case, the same as the second coverage mode) does meet the signal criteria for a predetermined threshold (e.g. a specified amount of time, or number of attempts), then the coverage is switched to second coverage mode, i.e. normal coverage. In other words, the switch to the second coverage mode is delayed based on the evaluation of 1104.

Figure 12:
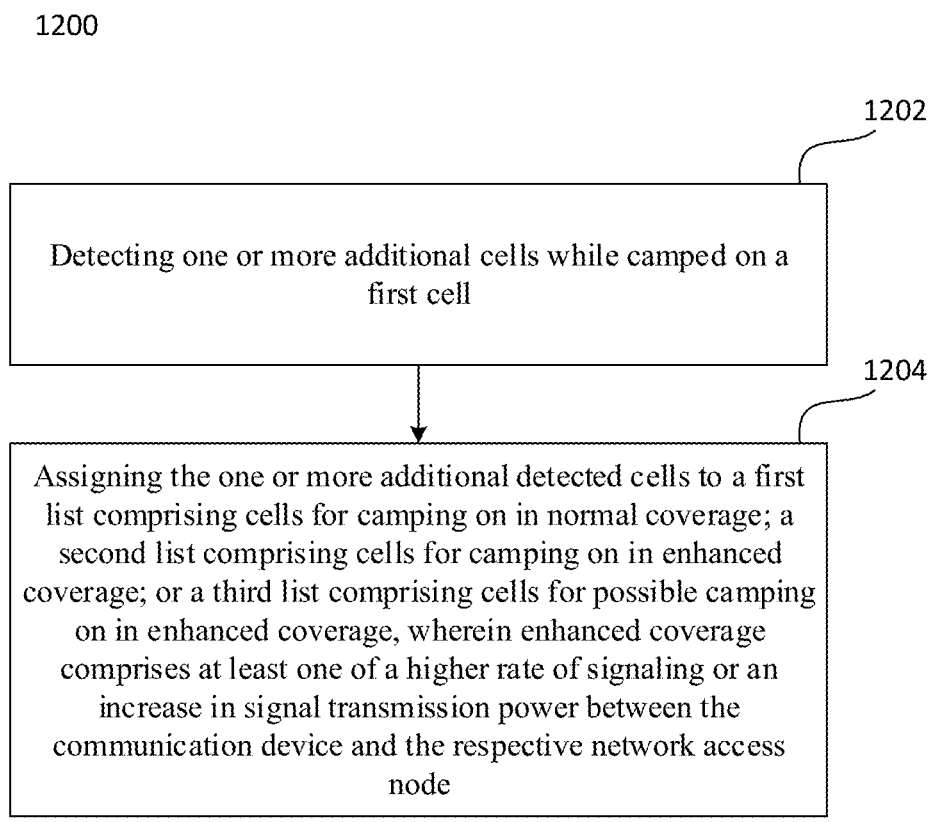
FIG. 12 shows an exemplary flowchart for assigning cells to priority lists according to some aspects.

FIG. 12 shows a flowchart 1200 for assigning cells to priority lists according to some aspects. It is appreciated that flowchart 1200 is exemplary in nature and may thus be simplified for purposes of this explanation.

After detecting one or more additional cells while camped on a first cell 1202, the one or more detected cells are assigned to one of the three lists described 1204 (i.e. one of List 1-3 in FIG. 7).

The following examples pertain to further aspects of this disclosure:

Example 1 is a communication device for wireless communications, the communication device including one or more processors configured to acquire a primary information from one or more network access nodes, wherein the primary information from the one or more network access nodes comprises an indication a network access node supports enhanced coverage; prior to or while camped on a cell of the network access node, acquire a first information corresponding to normal coverage from the network access node and a second information corresponding to enhanced coverage from the respective network access node; and camp on the cell of the respective network access node in normal coverage based on the first information. The primary information may be MIB(s), the first information may be SIB(s), and the second information may be SIB(s)-BR.

In Example 2, the subject matter of Example 1 may include wherein enhanced coverage comprises at least one of a higher rate of signaling or an increase in signal transmission power between the communication device and the network access node.

In Example 3, the subject matter of Examples 1-2 may include the one or more processors configured to acquire the first information and the second information in parallel.

In Example 4, the subject matter of Examples 1-2 may include the one or more processors configured to acquire the first information and the second information sequentially.

In Example 5, the subject matter of Examples 1-4 may include the one or more processors configured to prioritize the acquisition of the first information over the second information.

In Example 6, the subject matter of Examples 1-5 may include a memory configured to cache the second information.

In Example 7, the subject matter of Examples 1-6 may include the one or more processors configured to monitor for one or more enhanced coverage modifications to the second information.

In Example 8, the subject matter of Example 7 may include wherein the one or more enhanced coverage modifications are received on a Machine Type Communication (MTC) Physical Downlink Control Channel (MPDCCH).

In Example 9, the subject matter of Examples 1-8 may include the memory configured to cache the one or more enhanced coverage modifications.

In Example 10, the subject matter of Examples 1-9 may include wherein the primary information comprises one or more master information blocks (MIBs).

In Example 11, the subject matter of Examples 1-10 may include wherein the indication comprises a schedulingInfo-SIB1-BR-r13 message.

In Example 12, the subject matter of Examples 1-11 may include wherein the first information corresponding to normal coverage comprises one or more standard information blocks (SIBs).

In Example 13, the subject matter of Example 12 may include wherein one of the one or more SIBs is SIB1.

In Example 14, the subject matter of Examples 1-13 may include wherein the second information corresponding to enhanced coverage comprises one or more bandwidth reduced standard information blocks (SIBs-BR).

In Example 15, the subject matter of Example 14 may include wherein one of the one or more SIBs-BR is SIB1-BR.

In Example 16, the subject matter of Examples 1-15 may include the one or more processors configured to evaluate a signal criteria for normal coverage from the first information.

In Example 17, the subject matter of Example 16 may include wherein when the signal criteria for normal coverage is satisfied, the one or more processors configured to continue to receive enhanced coverage modifications.

In Example 18, the subject matter of Examples 16-17 may include the one or more processors configured to switch to enhanced coverage using the cached second information when the signal criteria for normal coverage is not satisfied.

In Example 19, the subject matter of Examples 16-17 may include the one or more processors configured to switch to enhanced coverage using the one or more cached enhanced coverage modifications when the signal criteria for normal coverage is not satisfied.

In Example 20, the subject matter of Examples 16-19 may include the one or more processors configured to determine whether the signal criteria for normal coverage is not satisfied for a predetermined threshold.

In Example 21, the subject matter of Example 20 may include wherein the predetermined threshold is a specified amount of time.

In Example 22, the subject matter of Example 21 may include wherein the specified amount of time is based on an out of service (OOS) timer.

In Example 23, the subject matter of Examples 21-22 may include wherein the specified amount of time is up to about 10 seconds.

In Example 24, the subject matter of Example 20 may include wherein the predetermined threshold is a specified number of attempts.

In Example 25, the subject matter of Example 24 may include wherein the specified number of attempts is based on a discontinuous reception (DRX) cycle.

In Example 26, the subject matter of Examples 24-25 may include wherein the specified number of attempts is an integer ranging from about 2 to about 4.

In Example 27, the subject matter of Examples 20-26 may include wherein when the signal criteria for normal coverage is not satisfied for the predetermined threshold, the one or more processors configured to retrieve at least one of the cached second information or the one or more cached enhance coverage modifications from a memory.

In Example 28, the subject matter of Example 27 may include the one or more processors configured to evaluate a signal criteria for enhanced coverage from the cached second information or the one or more cached enhance coverage modifications.

In Example 29, the subject matter of Example 28 may include the one or more processors configured to switch to enhanced coverage when the signal criteria for enhanced coverage is satisfied.

In Example 30, the subject matter of Example 29 may include the one or more processors configured to switch to normal coverage when the signal criteria for normal coverage is satisfied for a second predetermined threshold.

In Example 31, the subject matter of Example 30 may include wherein the second predetermined threshold is a number of attempts ranging from about 2 to about 4.

In Example 32, the subject matter of Example 31 may include the one or more processors configured to reacquire the first information for normal coverage.

In Example 33, the subject matter of Examples 1-32 may include wherein the first information and the second information are acquired prior to camping on the cell of the respective access node.

In Example 34, the subject matter of Examples 1-32 may include wherein the first information is acquired prior to camping on the cell of the respective access node in normal coverage, and the second information is acquired while camped on the cell of the respective access node in normal coverage.

In Example 35, a communication device for wireless communications, the communication device including one or more processors configured to camp on a cell of a network access node in a first coverage mode; evaluate whether a selected coverage mode satisfies a signal quality criteria for a predetermined threshold, wherein the predetermined threshold is an amount of time based on an out of service timer during which the signal quality criteria is satisfied or a plurality of evaluations for which the signal quality criteria is satisfied; and delay, based on the evaluation, a switch to a second coverage mode to camp on the cell.

In Example 36, the subject matter of Example 35 may include, wherein the one or more processors switch to the second coverage mode when the signal quality criteria is not satisfied for the predetermined threshold.

In Example 37, the subject matter of Example 36 may include, wherein the first coverage mode is normal coverage and the second coverage mode is enhanced coverage, wherein enhanced coverage comprises at least one of a higher rate of signaling or an increase in signal transmission power between the communication device and the network access node.

In Example 38, the subject matter of Example 37 may include the one or more processors are configured to acquire information for enhanced coverage while camped in normal coverage.

In Example 39, the subject matter of Example 38 may include a memory configured to cache the acquired information for enhanced coverage.

In Example 40, the subject matter of Examples 36-39 may include wherein the predetermined threshold is the specified amount of time.

In Example 41, the subject matter of Example 40 may include wherein the specified amount of time is based on a time remaining in the out of service (OOS) timer.

In Example 42, the subject matter of Examples 40-41 may include wherein the specified amount of time is up to about 10 seconds.

In Example 43, the subject matter of Examples 36-39 may include wherein the predetermined threshold is the specified number of attempts.

In Example 44, the subject matter of Example 43 may include wherein the specified number of attempts is based on a discontinuous reception (DRX) cycle.

In Example 45, the subject matter of Examples 43-44 may include wherein the specified number of attempts is an integer ranging from about 2 to about 4.

In Example 46, the subject matter of Example 35 may include wherein the one or more processors switch to the second coverage mode when the signal quality criteria is satisfied for the predetermined threshold.

In Example 47, the subject matter of Example 46 may include wherein the first coverage mode is enhanced coverage and the second coverage mode is normal coverage, wherein enhanced coverage comprises at least one of: a higher rate of signaling or an increase in signal transmission power, between the communication device and the network access node.

In Example 48, the subject matter of Examples 46-47 may include wherein the predetermined threshold is a specified number of attempts.

In Example 49, the subject matter of Example 48 may include wherein the specified number of attempts is based on a discontinuous reception (DRX) cycle.

In Example 50, the subject matter of Examples 48-49 may include wherein the specified number of attempts is an integer ranging from about 2 to about 4.

In Example 51, the subject matter of Examples 46-50 may include the one or more processors configured to reacquire a normal coverage information.

In Example 52, the subject matter of Example 51 may include wherein the normal coverage information is system information block-1 (SIB1).

In Example 53, a communication device for wireless communications, the communication device including one or more processors configured to detect one or more additional cells when camped on a first cell; and assign the one or more additional detected cells to a first list comprising cells for camping on in normal coverage; a second list comprising cells for camping on in enhanced coverage; or a third list comprising cells for possible camping on in enhanced coverage, wherein enhanced coverage comprises at least one of a higher rate of signaling or an increase in signal transmission power between the communication device and a network access node.

In Example 54, the subject matter of Example 53 may include the one or more processors configured to assign the detected one or more cells to the first list when the one or more additional cells satisfy a signal criteria for normal coverage.

In Example 55, the subject matter of Example 54 may include wherein the signal criteria is satisfied when Srxlev>0, wherein Srxlev=Qrxlevmeas−(Qrxlevmin+Qrxlevminoffset)−Pcompensation, wherein Qrxlevmeas is a Reference Signal Received Power (RSRP) measured by the communication device in dBm; Qrxlevmin is a minimum required RSRP signaled within SIB-1; Qrxlevminoffset is an offset to a signaled Qrxlevmin taken into account in the Srxlev evaluation when the UE is camped on a Visited Public Land Mobile Network (VPLMN), and if not, is set to zero; and Pcompensation is defined a maximum of the P_EMAX−P_UMAX and 0, wherein P_EMAX is a maximum transmission (Tx) power level the communication device may use when transmitting on the uplink the cell and P_PowerClass is a maximum radio frequency output power of the communication device.

In Example 56, the subject matter of Example(s) 53-55 may include the one or more processors configured to prioritize cells in the first list according to their respective measured signal criteria.

In Example 57, the subject matter of Example(s) 53-56 may include the one or more processors configured to determine whether the one or more detected cells broadcast an indication that the cell supports enhanced coverage.

In Example 58, the subject matter of Example(s) 57 may include the one or more processors configured to assign the one or more detected cells to the third list if no indication that the cell supports enhanced coverage exists.

In Example 59, the subject matter of Example(s) 57-58 may include wherein the indication is a CellSelectionInfoCE message.

In Example 60, the subject matter of Example(s) 57-59 may include the one or more processors configured to determine whether the one or more detected cells satisfies a signal criteria for enhanced coverage.

In Example 61, the subject matter of Example(s) 60 may include wherein when the one or more detected cells satisfies the signal criteria for enhance coverage, the one or more processors configured to assign the one or more detected cells to the second list.

In Example 62, the subject matter of Example(s) 61 may include wherein detected cells that satisfy the signal criteria for enhanced coverage are ranked higher in the second list than cells that do not satisfy the signal criteria for enhanced coverage.

In Example 63, the subject matter of Example(s) 60-62 may include wherein the signal criteria for enhanced coverage is satisfied when Srxlev>0, wherein Srxlev=Qrxlevmeas−(Qrxlevmin+Qrxlevminoffset)−Pcompensation, wherein Qrxlevmeas is a Reference Signal Received Power (RSRP) measured by the communication device in dBm; Qrxlevmin is a minimum required RSRP signaled within SIB-1; Qrxlevminoffset is an offset to a signaled Qrxlevmin taken into account in the Srxlev evaluation when the UE is camped on a Visited Public Land Mobile Network (VPLMN), and if not, is set to zero; and Pcompensation is defined a maximum of the P_EMAX−P_UMAX and 0, wherein P_EMAX is a maximum transmission (Tx) power level the communication device may use when transmitting on the uplink the cell and P_PowerClass is a maximum radio frequency output power of the communication device, wherein said values are taken in enhanced coverage.

In Example 64, the subject matter of Example(s) 53-63 may include the one or more processors configured to, in response to a triggering of a cell reselection, attempt to reselect to one or more cells listed in the first list, wherein upon a successful reselection to a first respective cell of the one or more cells in the first list, camping on the first respective cell in normal coverage.

In Example 65, the subject matter of Example(s) 64 may include the one or more processors configured to trigger an out of service (OOS) timer upon the cell reselection being triggered.

In Example 66, the subject matter of Example(s) 65 may include the one or more processors configured to attempt reselection to one or more of the cells in the second list at a predetermined time of the OOS timer.

In Example 67, the subject matter of Example(s) 66 may include wherein the predetermined time is at about 20% to about 40% time remaining on the OOS timer.

In Example 68, the subject matter of Example(s) 64-67 may include the one or more processors further configured to, wherein reselection to the one or more cells in the first list is unsuccessful, attempt to reselect to one or more enhanced coverage cells listed in the second list.

In Example 69, the subject matter of Example(s) 68 may include the one or more processors further configured to, wherein reselection to a first respective enhanced coverage cell of the one or more enhanced coverage cells in the second list, camp on the first respective enhanced coverage cell in enhanced coverage.

In Example 70, the subject matter of Example(s) 68-69 may include the one or more processors configured to, wherein reselection to the one or more enhanced coverage cells listed in the second list is not successful, trigger an out of service (OOS) timer if the OOS timer is not already running.

In Example 71, the subject matter of Example(s) 70 may include the one or more processors configured to attempt reselection to one or more of the cells in the third list at a predetermined time of the OOS timer.

In Example 72, the subject matter of Example(s) 71 may include, wherein the predetermined time is at about 20% to about 40% time remaining on the OOS timer.

In Example 73, the subject matter of Example(s) 71-72 may include the one or more processors configured to acquire a primary information for the one or more cells in the third list, wherein the primary information includes an indication whether the one or more cells in the third list supports enhanced coverage.

In Example 74, the subject matter of Example(s) 73 may include the one or more processors configured to evaluate a signal criteria in enhanced coverage for a respective one of the one or more cells in the third list when it is determined that the respective cell supports enhanced coverage.

In Example 75, the subject matter of Example(s) 74 may include the one or more processors configured to reselect to the respective one of the of the one or more cells in the third list when the signal criteria is satisfied, wherein the signal criteria for enhanced coverage is satisfied when Srxlev>0, wherein Srxlev=Qrxlevmeas−(Qrxlevmin+Qrxlevminoffset)−Pcompensation, wherein Qrxlevmeas is a Reference Signal Received Power (RSRP) measured by the communication device in dBm; Qrxlevmin is a minimum required RSRP signaled within SIB-1; Qrxlevminoffset is an offset to a signaled Qrxlevmin taken into account in the Srxlev evaluation when the UE is camped on a Visited Public Land Mobile Network (VPLMN), and if not, is set to zero; and Pcompensation is defined a maximum of the P_EMAX–P_UMAX and 0, wherein P_EMAX is a maximum transmission (Tx) power level the communication device may use when transmitting on the uplink the cell and P_PowerClass is a maximum radio frequency output power of the communication device, wherein said values are taken in enhanced coverage.

In Example 76, the subject matter of Example(s) 75 may include the one or more processors configured to reclassify the respective one of the one or more cells in the third list to the second list.

In Example 77, a method for a communication device to perform wireless communications, the method including acquiring a primary information from one or more network access nodes, wherein the primary information from the one or more network access nodes comprises an indication a network access node supports enhanced coverage; acquiring a first information corresponding to normal coverage from the network access node and a second information corresponding to enhanced coverage from the network access node; and camping on a cell of the network access node in normal coverage based on the first information, wherein the first information and the second information are acquired prior to or while camped on the cell in normal coverage.

In Example 78, the subject matter of Example(s) 77 may include wherein enhanced coverage comprises at least one of a higher rate of signaling or an increase in signal transmission power between the communication device and the network access node.

In Example 79, the subject matter of Example(s) 77-78 may include acquiring the first information and the second information in parallel.

In Example 80, the subject matter of Example(s) 77-78 may include acquiring the first information and the second information sequentially.

In Example 81, the subject matter of Example(s) 77-80 may include prioritizing the acquisition of the first information over the second information.

In Example 82, the subject matter of Example(s) 77-81 may include caching the second information.

In Example 83, the subject matter of Example(s) 77-82 may include monitoring for one or more enhanced coverage modifications to the second information.

In Example 84, the subject matter of Example(s) 83 may include wherein the one or more enhanced coverage modifications are received on a Machine Type Communication (MTC) Physical Downlink Control Channel (MPDCCH).

In Example 85, the subject matter of Example(s) 83-84 may include further comprising caching the one or more enhanced coverage modifications.

In Example 86, the subject matter of Example(s) 77-85 may include, wherein the primary information comprises one or more master information blocks (MIBs).

In Example 87, the subject matter of Example(s) 77-86 may include, wherein the indication comprises a schedulingInfoSIB1-BR-r13 message.

In Example 88, the subject matter of Example(s) 77-87 may include, wherein the first information corresponding to normal coverage comprises one or more standard information blocks (SIBs).

In Example 89, the subject matter of Example(s) 88 may include wherein one of the one or more SIBs is SIB1.

In Example 90, the subject matter of Example(s) 77-89 may include wherein the second information corresponding to enhanced coverage comprises one or more bandwidth reduced standard information blocks (SIBs-BR).

In Example 91, the subject matter of Example(s) 90 may include wherein one of the one or more SIBs-BR is SIB1-BR.

In Example 92, the subject matter of Example(s) 77-91 may include evaluating a signal criteria for normal coverage from the first information.

In Example 93, the subject matter of Example(s) 92 may include wherein when the signal criteria for normal coverage is satisfied, further comprising receiving enhanced coverage modifications.

In Example 94, the subject matter of Example(s) 92-93 may include switching to enhanced coverage using the cached second information when the signal criteria for normal coverage is not satisfied.

In Example 95, the subject matter of Example(s) 92-93 may include switching to enhanced coverage using the one or more cached enhanced coverage modifications when the signal criteria for normal coverage is not satisfied.

In Example 96, the subject matter of Example(s) 92-95 may include determining whether the signal criteria for normal coverage is not satisfied for a predetermined threshold.

In Example 97, the subject matter of Example(s) 96 may include wherein the predetermined threshold is a specified amount of time.

In Example 98, the subject matter of Example(s) 97 may include wherein the specified amount of time is based on an out of service (OOS) timer.

In Example 99, the subject matter of Example(s) 97-98 may include wherein the specified amount of time is up to about 10 seconds.

In Example 100, the subject matter of Example(s) 96 may include wherein the predetermined threshold is a specified number of attempts.

In Example 101, the subject matter of Example(s) 100 may include wherein the specified number of attempts is based on a discontinuous reception (DRX) cycle.

In Example 102, the subject matter of Example(s) 100-101 may include wherein the specified number of attempts is an integer ranging from about 2 to about 4.

In Example 103, the subject matter of Example(s) 96-102 may include wherein when the signal criteria for normal coverage is not satisfied for the predetermined threshold, further comprising retrieving at least one of the cached second information or the one or more cached enhance coverage modifications.

In Example 104, the subject matter of Example(s) 103 may include evaluating a signal criteria for enhanced coverage from the cached second information or the one or more cached enhance coverage modifications.

In Example 105, the subject matter of Example(s) 104 may include switching to enhanced coverage when the signal criteria for enhanced coverage is satisfied.

In Example 106, the subject matter of Example(s) 105 may include switching to normal coverage when the signal criteria for normal coverage is satisfied for a second predetermined threshold.

In Example 107, the subject matter of Example(s) 106 may include wherein the second predetermined threshold is a number of attempts ranging from about 2 to about 4.

In Example 108, the subject matter of Example(s) 107 may include reacquiring the first information for normal coverage.

In Example 109, the subject matter of Example(s) 77-108 may include wherein the first information and the second information are acquired prior to camping on the cell of the respective access node in normal coverage.

In Example 110, the subject matter of Example(s) 77-109 may include wherein the first information is acquired prior to camping on the cell of the respective access node in normal coverage, and the second information is acquired while camped on the cell of the respective access node in normal coverage.

In Example 111, a method for a communication device to perform wireless communications, the method including camping on a cell in a first coverage mode; evaluating whether the first coverage mode meets a signal quality criteria for a predetermined threshold, wherein the predetermined threshold is an amount of time based on an out of service timer during which the signal quality criteria is satisfied or a plurality of evaluations for which the signal quality criteria is satisfied; and delaying, based on the evaluation, a switch to a second coverage mode to camp on the cell.

In Example 112, the subject matter of Example(s) 111 may include switching to the second coverage mode when the signal quality criteria is not satisfied for the predetermined threshold.

In Example 113, the subject matter of Example(s) 112 may include wherein the first coverage mode is normal coverage and the second coverage mode is enhanced coverage, wherein enhanced coverage comprises at least one of a higher rate of signaling or an increase in signal transmission power between the communication device and the respective network access node.

In Example 114, the subject matter of Example(s) 113 may include acquiring information for enhanced coverage while camped in normal coverage.

In Example 115, the subject matter of Example(s) 114 may include caching the acquired information for enhanced coverage.

In Example 116, the subject matter of Example(s) 112-115 may include, wherein the predetermined threshold is the specified amount of time.

In Example 117, the subject matter of Example(s) 116 may include, wherein the specified amount of time is based on an out of service (OOS) timer.

In Example 118, the subject matter of Example(s) 116-117 may include, wherein the specified amount of time is up to about 10 seconds.

In Example 119, the subject matter of Example(s) 116-118 may include, wherein the predetermined threshold is the specified number of attempts.

In Example 120, the subject matter of Example(s) 119 may include, wherein the specified number of attempts is based on a discontinuous reception (DRX) cycle.

In Example 121, the subject matter of Example(s) 118-120 may include, wherein the specified number of attempts is an integer ranging from about 2 to about 4.

In Example 122, the subject matter of Example(s) 111 may include switching to the second coverage mode when the signal quality criteria is satisfied for the predetermined threshold.

In Example 123, the subject matter of Example(s) 122 may include wherein the first coverage mode is enhanced coverage and the second coverage mode is normal coverage, wherein enhanced coverage comprises at least one of: a higher rate of signaling or an increase in signal transmission power, between the communication device and the respective network access node.

In Example 124, the subject matter of Example(s) 122-123 may include, wherein the predetermined threshold is a specified number of attempts.

In Example 125, the subject matter of Example(s) 124 may include, wherein the specified number of attempts is based on a discontinuous reception (DRX) cycle.

In Example 126, the subject matter of Example(s) 124-125 may include, wherein the specified number of attempts is an integer ranging from about 2 to about 4.

In Example 127, the subject matter of Example(s) 122-126 may include reacquiring a normal coverage information.

In Example 128, the subject matter of Example(s) 127 may include, wherein the normal coverage information is system information block-1 (SIB1).

In Example 129, a method for a communication device to perform wireless communications, the method including detecting one or more additional cells when camped on a first cell; and assigning the one or more additional detected cells to a first list comprising cells for camping on in normal coverage; a second list comprising cells for camping on in enhanced coverage; or a third list comprising cells for possible camping on in enhanced coverage; wherein enhanced coverage comprises at least one of a higher rate of signaling or an increase in signal transmission power between the communication device and a network access node.

In Example 130, the subject matter of Example(s) 129 may include assigning the detected one or more cells to the first list when the one or more additional cells satisfy a signal criteria for normal coverage.

In Example 131, the subject matter of Example(s) 130 may include wherein the signal criteria is satisfied when Srxlev>0, wherein Srxlev=Qrxlevmeas−(Qrxlevmin+Qrxlevminoffset)−Pcompensation, wherein Qrxlevmeas is a Reference Signal Received Power (RSRP) measured by the communication device in dBm; Qrxlevmin is a minimum required RSRP signaled within SIB-1; Qrxlevminoffset is an offset to a signaled Qrxlevmin taken into account in the Srxlev evaluation when the UE is camped on a Visited Public Land Mobile Network (VPLMN), and if not, is set to zero; and Pcompensation is defined a maximum of the P_EMAX−P_UMAX and 0, wherein P_EMAX is a maximum transmission (Tx) power level the communication device may use when transmitting on the uplink the cell and P_PowerClass is a maximum radio frequency output power of the communication device.

In Example 132, the subject matter of Example(s) 129-131 may include prioritizing cells in the first list according to their respective measured signal criteria.

In Example 133, the subject matter of Example(s) 129-132 may include determining whether the one or more detected cells broadcast an indication that the cell supports enhanced coverage.

In Example 134, the subject matter of Example(s) 133 may include assigning the one or more detected cells to the third list if no indication that the cell supports enhanced coverage exists.

In Example 135, the subject matter of Example(s) 133-134 may include wherein the indication is a CellSelectionInfoCE message.

In Example 136, the subject matter of Example(s) 133-135 may include determining whether the one or more detected cells satisfies a signal criteria for enhanced coverage.

In Example 137, the subject matter of Example(s) 136 may include, wherein when the one or more detected cells satisfies the signal criteria for enhance coverage, further comprising assigning the one or more detected cells to the second list.

In Example 138, the subject matter of Example(s) 137 may include ranking cells satisfying the signal criteria for enhanced coverage higher in the second list than cells that do not satisfy the signal criteria for enhanced coverage.

In Example 139, the subject matter of Example(s) 136-138 may include wherein the signal criteria for enhanced coverage is satisfied when Srxlev>0, wherein Srxlev=Qrxlevmeas−(Qrxlevmin+Qrxlevminoffset)−Pcompensation, wherein Qrxlevmeas is a Reference Signal Received Power (RSRP) measured by the communication device in dBm; Qrxlevmin is a minimum required RSRP signaled within SIB-1; Qrxlevminoffset is an offset to a signaled Qrxlevmin taken into account in the Srxlev evaluation when the UE is camped on a Visited Public Land Mobile Network (VPLMN), and if not, is set to zero; and Pcompensation is defined a maximum of the P_EMAX−P_UMAX and 0, wherein P_EMAX is a maximum transmission (Tx) power level the communication device may use when transmitting on the uplink the cell and P_PowerClass is a maximum radio frequency output power of the communication device, wherein said values are taken in enhanced coverage.

In Example 140, the subject matter of Example(s) 129-139 may include, in response to a triggering of a cell reselection, attempting to reselect to one or more cells listed in the first list, wherein upon a successful reselection to a first respective cell of the one or more cells in the first list, camping on the first respective cell in normal coverage.

In Example 141, the subject matter of Example(s) 140 may include, further comprising triggering an out of service (OOS) timer upon the cell reselection being triggered.

In Example 142, the subject matter of Example(s) 141 may include attempting reselection to one or more of the cells in the second list at a predetermined time of the OOS timer.

In Example 143, the subject matter of Example(s) 142 may include wherein the predetermined time is at about 20% to about 40% time remaining on the OOS timer.

In Example 144, the subject matter of Example(s) 140-143 may include wherein reselection to the one or more cells in the first list is unsuccessful, attempting to reselect to one or more enhanced coverage cells listed in the second list.

In Example 145, the subject matter of Example(s) 144 may include, wherein reselection to a first respective enhanced coverage cell of the one or more enhanced coverage cells in the second list, camping on the first respective enhanced coverage cell in enhanced coverage.

In Example 146, the subject matter of Example(s) 144-145 may include, wherein reselection to the one or more enhanced coverage cells listed in the second list is not successful, triggering an out of service (OOS) timer if the OOS timer is not already running.

In Example 147, the subject matter of Example(s) 146 may include attempting reselection to one or more of the cells in the third list at a predetermined time of the OOS timer.

In Example 148, the subject matter of Example(s) 147 may include, wherein the predetermined time is at about 20% to about 40% time remaining on the OOS timer.

In Example 149, the subject matter of Example(s) 146-147 may include acquiring a primary information for the one or more cells in the third list, wherein the primary information includes an indication whether the one or more cells in the third list supports enhanced coverage.

In Example 150, the subject matter of Example(s) 149 may include evaluating a signal criteria in enhanced coverage for a respective one of the one or more cells in the third list when it is determined that the respective cell supports enhanced coverage.

In Example 151, the subject matter of Example(s) 150 may include reselecting to the respective one of the of the one or more cells in the third list when the signal criteria is satisfied, wherein the signal criteria for enhanced coverage is satisfied when Srxlev>0, wherein Srxlev=Qrxlevmeas−(Qrxlevmin+Qrxlevminoffset)−Pcompensation, wherein Qrxlevmeas is a Reference Signal Received Power (RSRP) measured by the communication device in dBm; Qrxlevmin is a minimum required RSRP signaled within SIB-1; Qrxlevminoffset is an offset to a signaled Qrxlevmin taken into account in the Srxlev evaluation when the UE is camped on a Visited Public Land Mobile Network (VPLMN), and if not, is set to zero; and Pcompensation is defined a maximum of the P_EMAX−P_UMAX and 0, wherein P_EMAX is a maximum transmission (Tx) power level the communication device may use when transmitting on the uplink the cell and P_PowerClass is a maximum radio frequency output power of the communication device, wherein said values are taken in enhanced coverage.

In Example 152, the subject matter of Example(s) 151 may include reclassifying the respective one of the one or more cells in the third list to the second list.

In Example 153, one or more non-transitory computer-readable media storing instructions thereon that, when executed by at least one processor, direct the at least one processor to perform a method or realize a device as recited in any preceding Example.

While the above descriptions and connected figures may depict electronic device components as separate elements, skilled persons will appreciate the various possibilities to combine or integrate discrete elements into a single element. Such may include combining two or more circuits for form a single circuit, mounting two or more circuits onto a common chip or chassis to form an integrated element, executing discrete software components on a common processor core, etc. Conversely, skilled persons will recognize the possibility to separate a single element into two or more discrete elements, such as splitting a single circuit into two or more separate circuits, separating a chip or chassis into discrete elements originally provided thereon, separating a software component into two or more sections and executing each on a separate processor core, etc.

It is appreciated that implementations of methods detailed herein are exemplary in nature, and are thus understood as capable of being implemented in a corresponding device. Likewise, it is appreciated that implementations of devices detailed herein are understood as capable of being implemented as a corresponding method. It is thus understood that a device corresponding to a method detailed herein may include one or more components configured to perform each aspect of the related method.

All acronyms defined in the above description additionally hold in all claims included herein.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A communication device for wireless communications, the communication device comprising:
   at least one processor configured to:
   acquire a primary information from at least one network access node, wherein the primary information from the at least one network access node comprises an indication that a network access node supports enhanced coverage;
   prior to or while camped on a cell of the network access node in normal coverage, acquire a first information corresponding to normal coverage from the network access node and a second information corresponding to enhanced coverage from the network access node, wherein the second information comprises information received in one or more bandwidth reduced system information blocks (SIB-BRs), and cache the second information in a memory of the communication device;
   camp on the cell of the network access node in normal coverage based on the first information; and
   evaluate a signal criteria for normal coverage from the first information and connect to the network access node in enhanced coverage using the cached second information when the signal criteria for normal coverage is not satisfied by determining that the signal criteria, comprising a cell selection reception level value and/or a cell selection quality value, falls below a respective threshold, wherein the cell selection reception level value is determined based on a measured cell reception level value of a reference signal received from the network access node, a predetermined threshold, and a difference between a maximum transmission power level the communication device uses when transmitting to the network access node and a maximum output power of the communication device, and wherein the cell selection quality value is determined based on a measured cell quality value received from the network access node, a minimum required signal quality of the network access node, and an offset in the minimum in signal quality of the network access node when the communication device is camped on a network of the network access node.

2. The communication device of claim 1, wherein enhanced coverage comprises at least one of a higher rate of signaling or an increase in signal transmission power between the communication device and the network access node.

3. The communication device of claim 1, the at least one processor configured to acquire the first information and the second information in parallel.

4. The communication device of claim 1, the at least one processor configured to acquire the first information and the second information sequentially.

5. The communication device of claim 1, the at least one processor configured to monitor for at least one enhanced coverage modification to the second information.

6. The communication device of claim 5, further comprising a memory configured to cache the at least one enhanced coverage modification.

7. The communication device of claim 6, the at least one processor configured to evaluate a signal criteria for normal coverage from the first information and to connect to enhanced coverage using the at least one cached enhanced coverage modification when the signal criteria for normal coverage is not satisfied.

8. The communication device of claim 1, wherein the cell selection reception level value is determined based on a measure of a Reference Signal Received Power (RSRP) received from the first information, a minimum required reception level of the first information, an offset to the minimum required reception level of the first information taken into account when the communication device is camped on a visited Public Land Mobile Network, and a difference between a maximum transmission level power level the communication device uses when transmitting in an uplink and a maximum radio frequency output power of the communication device.

9. A method for a communication device to perform wireless communications, the method comprising:
   acquiring a primary information from at least one network access node, wherein the primary information from the at least one network access node comprises an indication a network access node supports enhanced coverage;
   prior to or while camped on a cell of the network in normal coverage, acquiring a first information corresponding to normal coverage from the network access node and a second information corresponding to enhanced coverage from the network access node, wherein the second information comprises information received in one or more bandwidth reduced system information blocks (SIB-BRs);
   caching the second information;
   camping on the cell of the network access node in normal coverage based on the first information; and
   evaluating a signal criteria for normal coverage from the first information and connecting to the network access node in enhanced coverage using the cached second information when the signal criteria for normal coverage is not satisfied by determining that the signal criteria, comprising a cell selection reception level value and/or a cell selection quality value, falls below a threshold, wherein the cell selection reception level value is determined based on a measured cell reception level value of a reference signal received from the network access node, a predetermined threshold, and a difference between a maximum transmission power level the communication device uses when transmitting to the network access node and a maximum output power of the communication device, and wherein the cell selection quality value is determined based on a measured cell quality value received from the network access node, a minimum in signal quality of a network access node, and an offset in the minimum in signal quality of a network access node when the communication device is camped on a network of the network access node,
   wherein the first information and the second information are acquired, and the second information is cached, prior to or while camped on the cell in normal coverage, wherein the threshold is zero.

10. The method of claim 9, wherein enhanced coverage comprises at least one of a higher rate of signaling or an increase in signal transmission power between the communication device and the network access node.

11. The method of claim 9, further comprising monitoring for at least one enhanced coverage modification to the second information and caching the at least one enhanced coverage modification.

12. The method of claim 9, further comprising acquiring the first information and the second information in parallel.

13. The method of claim 9, further comprising acquiring the first information and the second information sequentially.

14. The method of claim 9, further comprising monitoring for at least one enhanced coverage modification to the second information, caching the at least one enhanced coverage modification, and evaluating the signal criteria for normal coverage from the first information and connecting to enhanced coverage using the at least one cached enhanced coverage modification when the signal criteria for normal coverage is not satisfied.

15. One or more non-transitory readable media, which when executed by one or more processors of a communication device, cause the communication device to perform a method comprising:

acquiring a primary information from at least one network access node, wherein the primary information from the at least one network access node comprises an indication a network access node supports enhanced coverage;

prior to or while camped on a cell of the network in normal coverage, acquiring a first information corresponding to normal coverage from the network access node and a second information corresponding to enhanced coverage from the network access node, wherein the second information comprises information received in one or more bandwidth reduced system information blocks (SIB-BRs);

caching the second information;

camping on the cell of the network access node in normal coverage based on the first information; and evaluating a signal criteria for normal coverage from the first information and connecting to the network access node in enhanced coverage using the cached second information when the signal criteria for normal coverage is not satisfied by determining that the signal criteria, comprising a cell selection reception level value and/or a cell selection quality value, falls below a threshold, wherein the cell selection reception level value is determined based on a measured cell reception level value of a reference signal received from the network access node, a predetermined threshold, and a difference between a maximum transmission power level the communication device uses when transmitting to the network access node and a maximum output power of the communication device, and wherein the cell selection quality value is determined based on a measured cell quality value received from the network access node, a minimum in signal quality of a network access node, and an offset in the minimum in signal quality of a network access node when the communication device is camped on a network of the network access node, wherein the first information and the second information are acquired, and the second information is cached, prior to or while camped on the cell in normal coverage.

16. The one or more non-transitory computer readable media of claim 15, wherein enhanced coverage comprises at least one of a higher rate of signaling or an increase in signal transmission power between the communication device and the network access node.

17. The one or more non-transitory computer readable media of claim 15, wherein enhanced coverage comprises at least one of a higher rate of signaling or an increase in signal transmission power between the communication device and the network access node.

18. The one or more non-transitory computer readable media of claim 15, further comprising monitoring for at least one enhanced coverage modification to the second information and caching the at least one enhanced coverage modification.

19. The one or more non-transitory computer readable media of claim 15, further comprising acquiring the first information and the second information in parallel.

20. The one or more non-transitory computer readable media of claim 15, further comprising acquiring the first information and the second information sequentially.

* * * * *